US008165301B1

(12) United States Patent
Bruce et al.

(10) Patent No.: US 8,165,301 B1
(45) Date of Patent: Apr. 24, 2012

(54) INPUT-OUTPUT DEVICE AND STORAGE CONTROLLER HANDSHAKE PROTOCOL USING KEY EXCHANGE FOR DATA SECURITY

(75) Inventors: Rey Bruce, San Jose, CA (US); Marizonne Operio Fuentes, Tanauan (PH); Raquel Bautista David, Manila (PH)

(73) Assignee: BiTMICRO Networks, Inc., Fremont, CA (US)

( * ) Notice: Subject to any disclaimer, the term of this patent is extended or adjusted under 35 U.S.C. 154(b) by 1465 days.

(21) Appl. No.: 11/398,321

(22) Filed: Apr. 4, 2006

(51) Int. Cl.
*H04L 9/06* (2006.01)
(52) U.S. Cl. .................... 380/277; 713/189
(58) Field of Classification Search .................. None
See application file for complete search history.

(56) References Cited

U.S. PATENT DOCUMENTS

| 5,644,784 | A | 7/1997 | Peek |
| 5,822,251 | A | 10/1998 | Bruce et al. |
| 5,875,351 | A | 2/1999 | Riley |
| 5,881,264 | A | 3/1999 | Kurosawa |
| 5,918,033 | A | 6/1999 | Heeb et al. |
| 5,943,421 | A | 8/1999 | Grabon |
| 6,215,875 | B1 * | 4/2001 | Nohda .................. 380/202 |
| 6,230,269 | B1 * | 5/2001 | Spies et al. .................. 713/182 |
| 6,298,071 | B1 | 10/2001 | Taylor et al. |
| 6,363,441 | B1 | 3/2002 | Bentz et al. |
| 6,363,444 | B1 | 3/2002 | Platko et al. |
| 6,404,772 | B1 | 6/2002 | Beach et al. |
| 6,526,506 | B1 | 2/2003 | Lewis |
| 6,557,095 | B1 | 4/2003 | Henstrom |
| 6,857,076 | B1 | 2/2005 | Klein |
| 6,970,446 | B2 | 11/2005 | Krischer et al. |
| 6,980,795 | B1 * | 12/2005 | Hermann et al. ............ 455/410 |
| 7,194,766 | B2 | 3/2007 | Noehring et al. |

(Continued)

FOREIGN PATENT DOCUMENTS

JP         2004-127068         4/2005

(Continued)

OTHER PUBLICATIONS

Simple Network Management Protocol—Wikipedia, the free encyclopedia, http://en.wikipedia.org/wiki/Simple_Network_Management_Protocol, hereinafter SNMP V3.*

*Primary Examiner* — Gilberto Barron, Jr.
*Assistant Examiner* — Simon Kanaan
(74) *Attorney, Agent, or Firm* — Uriarte Law

(57) ABSTRACT

A protocol for providing secured IO device and storage controller handshake protocol; IO device controlled cipher settings, and secured data storage and access in memory. An IO device requesting data transfer with encryption and/or decryption, requests session keys from the processor. The processor generates a fresh public-private key pair for the session. The public key is sent to the requesting IO device; the private key is momentarily saved by the processor for the session. The requesting IO device generates a secret key and its desired cipher setting; furthermore, encrypts the secret key and cipher setting using the public key, and sends secret key and cipher setting to the processor. The processor uses the private key to decrypt the secret key and cipher setting. The cipher setting is used for configuring the data processing core. The secret key is used for encryption and/or decryption of the data being transferred. All keys are not permanently saved.

57 Claims, 35 Drawing Sheets

U.S. PATENT DOCUMENTS

| | | | |
|---|---|---|---|
| 7,283,629 B2 * | 10/2007 | Kaler et al. | 380/44 |
| 7,305,548 B2 * | 12/2007 | Pierce et al. | 713/155 |
| 7,372,962 B2 | 5/2008 | Fujimoto et al. | |
| 7,620,748 B1 | 11/2009 | Bruce et al. | |
| 7,716,389 B1 | 5/2010 | Bruce et al. | |
| 2002/0073324 A1 | 6/2002 | Hsu et al. | |
| 2003/0182576 A1 * | 9/2003 | Morlang et al. | 713/201 |
| 2003/0223585 A1 * | 12/2003 | Tardo et al. | 380/277 |
| 2004/0128553 A1 * | 7/2004 | Buer et al. | 713/201 |
| 2007/0019573 A1 | 1/2007 | Nishimura | |
| 2007/0083680 A1 | 4/2007 | King et al. | |
| 2007/0174493 A1 | 7/2007 | Irish et al. | |
| 2007/0195957 A1 | 8/2007 | Arulambalam et al. | |

FOREIGN PATENT DOCUMENTS

| | | |
|---|---|---|
| JP | 2005-309847 A | 11/2005 |

* cited by examiner

| | |
|---|---|
| OPCODE | This field defines the operation code<br>Command |
| SUBCMD | This field specifies the sub command number<br>Request Key SubCmd |
| INITIATOR ID | This field specifies the identity of the initiator |

Figure 9

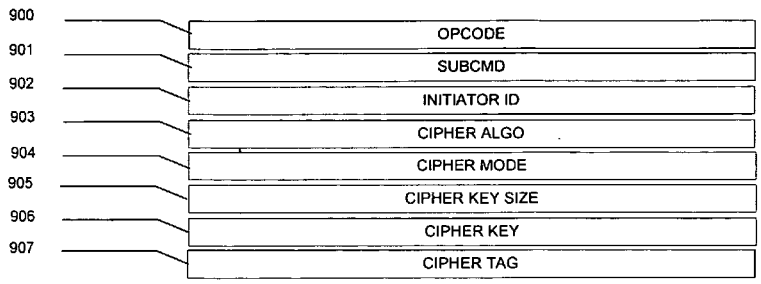

| | |
|---|---|
| OPCODE | SET_CIPHER<br>This field defines the operation code<br>Command |
| SUBCMD | This field specifies the sub command number<br>SET_CIPHER SubCmd |
| INITIATOR ID | This field specifies the identity of the initiator |
| CIPHER ALGO | This field identifies the type of algorithm to be used for encryption/decryption<br>00    AES<br>01    DES<br>10    Blowfish<br>xx    Rsvd |
| CIPHER MODE | This field identifies the mode of cipher encryption/decryption to be used<br>000    ECB (Electronic Codebook)<br>001    CBC (Cipher Block Chaining)<br>010    CFB (Cipher Feedback)<br>011    OFB (Output Feedback)<br>1xx    Rsvd |
| CIPHER KEY SIZE | This field specifies the length of the key to be used. Example below is the encoding for AES. This key size changes depending on the cipher algorithm used.<br>0000    128b<br>0001    192b<br>0010    256b<br>0011    320b<br>0100    384b<br>0101    448b<br>0110    512b<br>0111    576b<br>1000    640b<br>1001    704b<br>1010    768b<br>1011    832b<br>1100    896b<br>1101    960b<br>1110    1024b<br>1111    Rsvd |
| CIPHER KEY | This field is random generated number, referred as encryption and/or decryption key, or the secret key |
| CIPHER TAG | This field specifies the identity both of this cipher setting and the secret key |

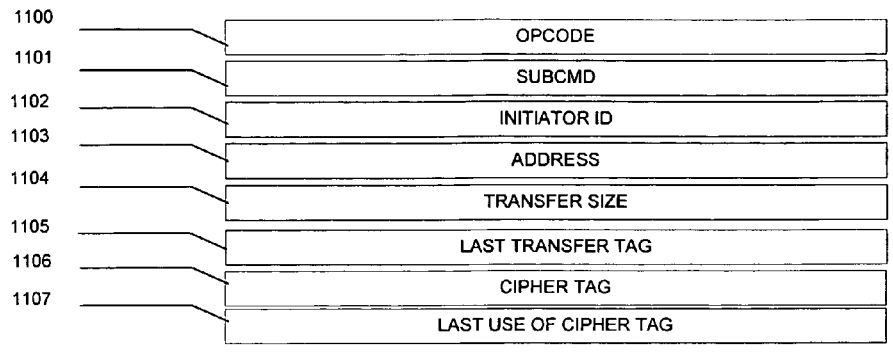

IO_CMD

| | |
|---|---|
| OPCODE | This field defines the operation code Command |
| SUBCMD | This field specifies the sub command number<br>IO_CMD SubCmd for Write-Encrypt<br>IO_CMD SubCmd for Write-Decrypt<br>IO_CMD SubCmd for Read-Decrypt<br>IO_CMD SubCmd for Read- Encrypt<br>IO_CMD SubCmd for Encrypt<br>IO_CMD SubCmd for Decrypt |
| INITIATOR ID | This field specifies the identity of the initiator |
| ADDRESS | This field specifies the address of where the data to be written or fetched |
| TRANSFER SIZE | This field specifies the maximum size of the data to be transferred. |
| LAST TRANSFER TAG | This field specifies whether the data being transferred is the last data. |
| CIPHER TAG | This field specifies the identity of the secret key and cipher settings being utilized during data transfers. |
| LAST USE OF CIPHER TAG | This field specifies whether upon sending this command, the cipher key and cipher setting tagged in CIPHER TAG is used last |

Figure 11

INPUT-OUTPUT DEVICE AND STORAGE CONTROLLER HANDSHAKE PROTOCOL USING KEY EXCHANGE FOR DATA SECURITY

FIELD OF THE INVENTION

The present invention pertains to a handshake protocol between the input-output ("IO") device and the storage controller. Aside from simple IO device commands, the present invention allows issuance of commands with data encryption and/or decryption. Moreover, the present invention allows the IO device total control of the cipher settings of the encryption and/or decryption (or the data processing) core for optimum efficiency. Furthermore, the present invention pertains to a handshake protocol between the IO device and the storage controller using the key exchange. This makes use of fresh session keys for data encryption and/or decryption.

BACKGROUND

This application relates to U.S. patent application Ser. No. 11/378,762, now U.S. Pat. No. 7,716,389 B1 and entitled "Direct Memory Access Controller with Encryption and Decryption for Non-blocking High Bandwidth IO Transactions", which is incorporated herein by reference and hereinafter referred to as the "Related Patent".

The usual command phase handshake between an IO device and a storage controller consists of direct issuance of IO commands; the IO device has no option to request that the data it wants to transfer is encrypted and/or decrypted. Consequently, there is a need for a more secure IO device and storage controller handshake protocol that provides data security.

In a traditional architecture that supports encryption and/or decryption, the storage controller has a dedicated data processing core for processing information like encryption and/or decryption. Furthermore, the data processing core has a module which is responsible for data encryption and/or decryption. The encryption and/or decryption set-up of this core is usually done during initialization and is commonly unchangeable. Consequently, there is a need for a dynamic change of cipher settings for optimum encryption and/or decryption efficiency.

Data security is a necessity for keeping secret information secure. It concerns not only data storage but also data access. Examples of these security measures are the use of passwords for authentication and encrypting keys in a memory. Typically, a password is stored in a computer file. When a user logs on, the user entry is compared to a saved password. When a password is divulged, all secret files are leaked out. Similarly, saving encrypting keys in a memory can be easily attacked by adversaries. Consequently, there is a need for improving data security when accessing data-access.

SUMMARY

It is an objective of the present invention to allow the IO device to issue IO commands with options for data encryption and/or decryption. It is also an objective of the present invention to increase the encryption and/or decryption efficiency of the data processing core by allowing the IO device to actively choose cipher settings that suits its data encryption and/or decryption requirement. It is also an objective of the present invention to give assurance to the IO device that all data it wishes to be secured are inaccessible by others. Hence, the present invention makes use of session keys that are always fresh for every transaction.

In an embodiment of the present invention, an IO device who wants to perform data transfer with encryption and/or decryption first requests a session key from the processor. The processor generates a fresh public-private key pair for the session. The public key is sent to the requesting IO device; the private key is momentarily saved by the processor for the session. The requesting IO device generates a secret key and a desired cipher setting. It encrypts the secret key and cipher setting by using the public key. Finally, it sends the encrypted information to the processor. The processor uses its private key to decrypt the secret key and the cipher setting. The processor sets up the data processing core by using the cipher setting and sends the secret key to the data processing core. The secret key is used for encryption/decryption of the data being transferred. The encryption setting is used for encryption commands, while the decryption setting is used for decryption commands. All keys are not saved to ensure key freshness and data security.

These and other implementations, their variations, applications, and associated advantages and benefits are described in greater detail in the attached drawings, the detailed description, and the claims. This summary does not purport to define the invention. The invention is defined by the claims.

BRIEF DESCRIPTION OF THE DRAWINGS

The accompanying drawings, which are incorporated in and form a part of this patent, illustrate embodiments of the present invention. Together with the description, the drawings serve to explain the principles of the invention.

FIG. 9 shows the detail information that the IO device creates when setting up the data processing core according to an embodiment of the present invention.

FIG. 11 shows the detail information in the command block that the IO device sends to the processor during data transfer according to an embodiment of the present invention.

DETAILED DESCRIPTION OF THE INVENTION

Figure 1:
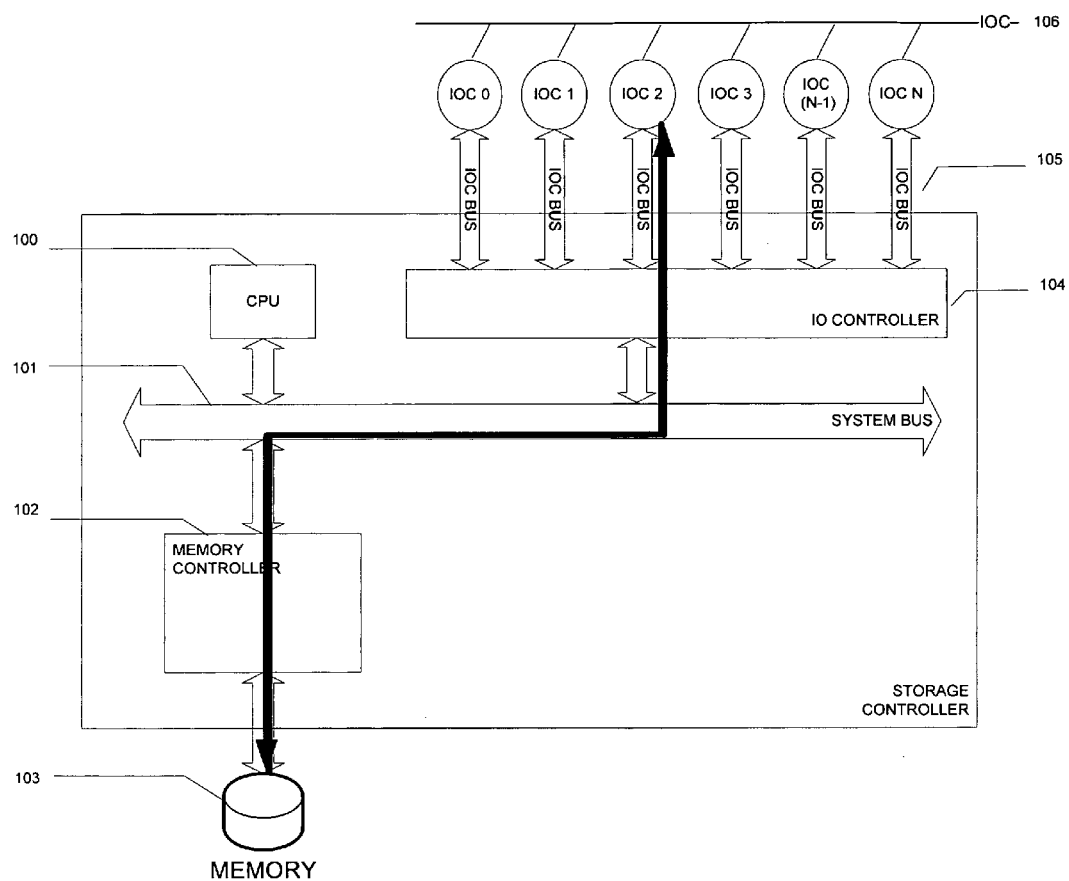
FIG. 1 shows the normal Write and Read sequences according to prior art IO and storage controller handshake protocol.

The usual command phase handshake is a direct issuance of normal Write or normal Read commands as shown in FIG. 1. The protocol of the present invention however has the following features: aside from the normal IO commands, it allows the IO device to issue commands with options for data encryption and/or decryption; it gives assurance to the IO device that all secured data are inaccessible to others by making use of session keys that are always fresh for every transaction; it increases the encryption and/or decryption efficiency of the data processing core by allowing the IO device to actively choose a cipher setting that suits data encryption and/or decryption requirement. The protocol also supports single secret key per transaction and multiple tagged secret keys per session as part of key management.

FIG. 1 shows the normal Write and Read sequences according to prior art IO device and storage controller handshake protocol. The IOC [106] requesting to write to the memory [103] sends a normal Write Request signal to CPU [100]. The CPU [100] sends a WrXfer Ready signal. The IOC [106] sends data to the Memory controller [102] via IO controller [104]. Finally, after all the data are written to the memory [103], the CPU [100] sends a Status signal to IOC [106]. Similarly with read transfer, the IOC [106] requesting to read from the memory [103] sends a normal Read Request signal to CPU [100]. The Memory controller retrieves data from the memory [103] and sends the data to IOC [106] via the IO controller [104]. Finally, after all the data are sent to IOC [106], the CPU [100] sends a Status signal to it. In these scenarios, the IO device has no option to request that the data be encrypted and/or decrypted.

Figure 2A:
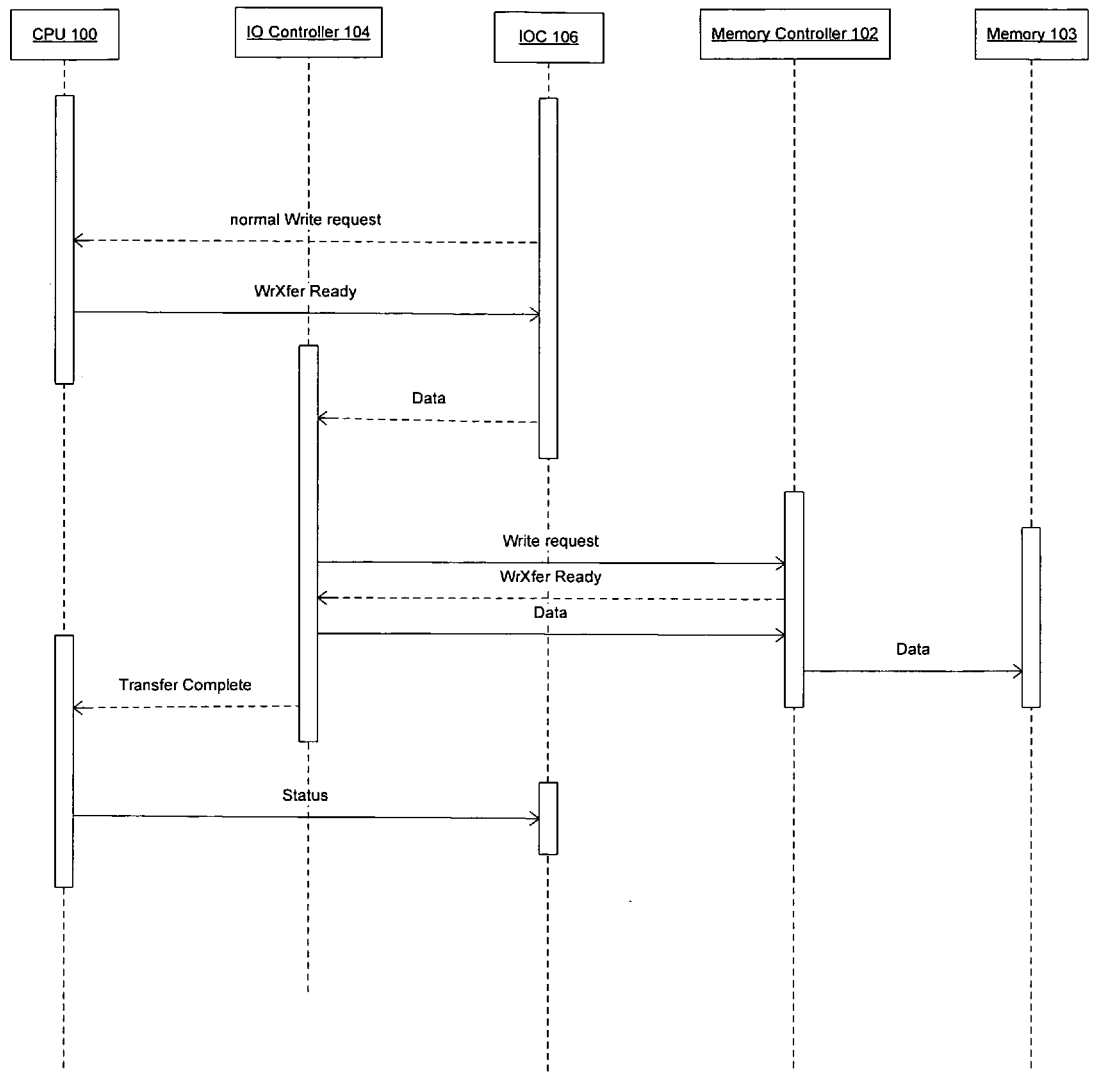
FIGS. 2a and 2b are the UML (Unified Modeling Language) and flowchart diagrams, respectively for normal Write transfer according to prior art IO device and storage controller handshake protocol.
Figure 2B:
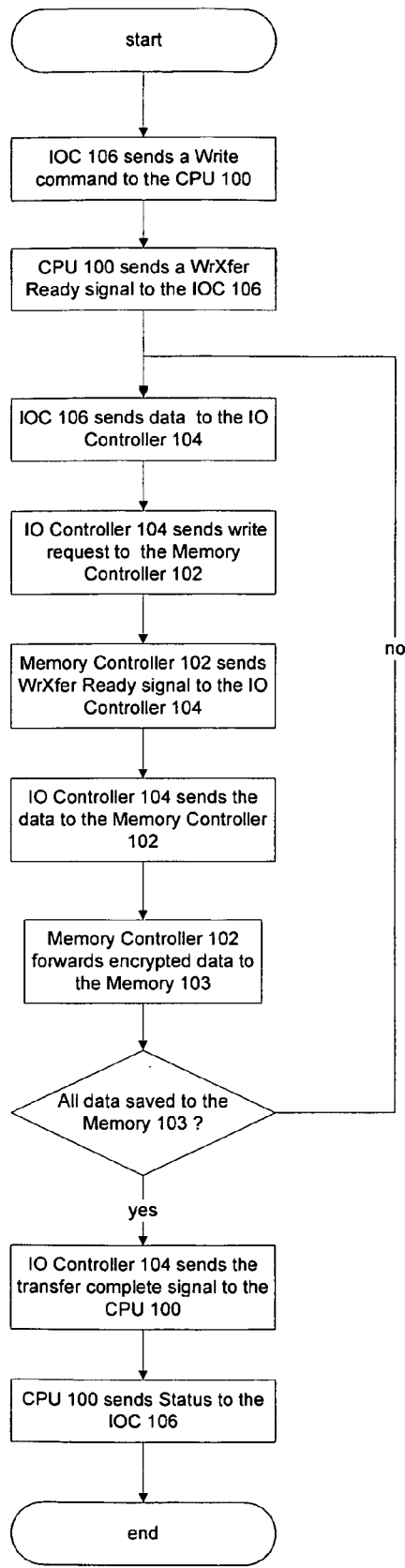

FIGS. 2a and 2b are the UML (Unified Modeling Language) and flowchart diagrams, respectively for normal Write transfer according to prior art IO device and storage controller handshake protocol.

Figure 3A:
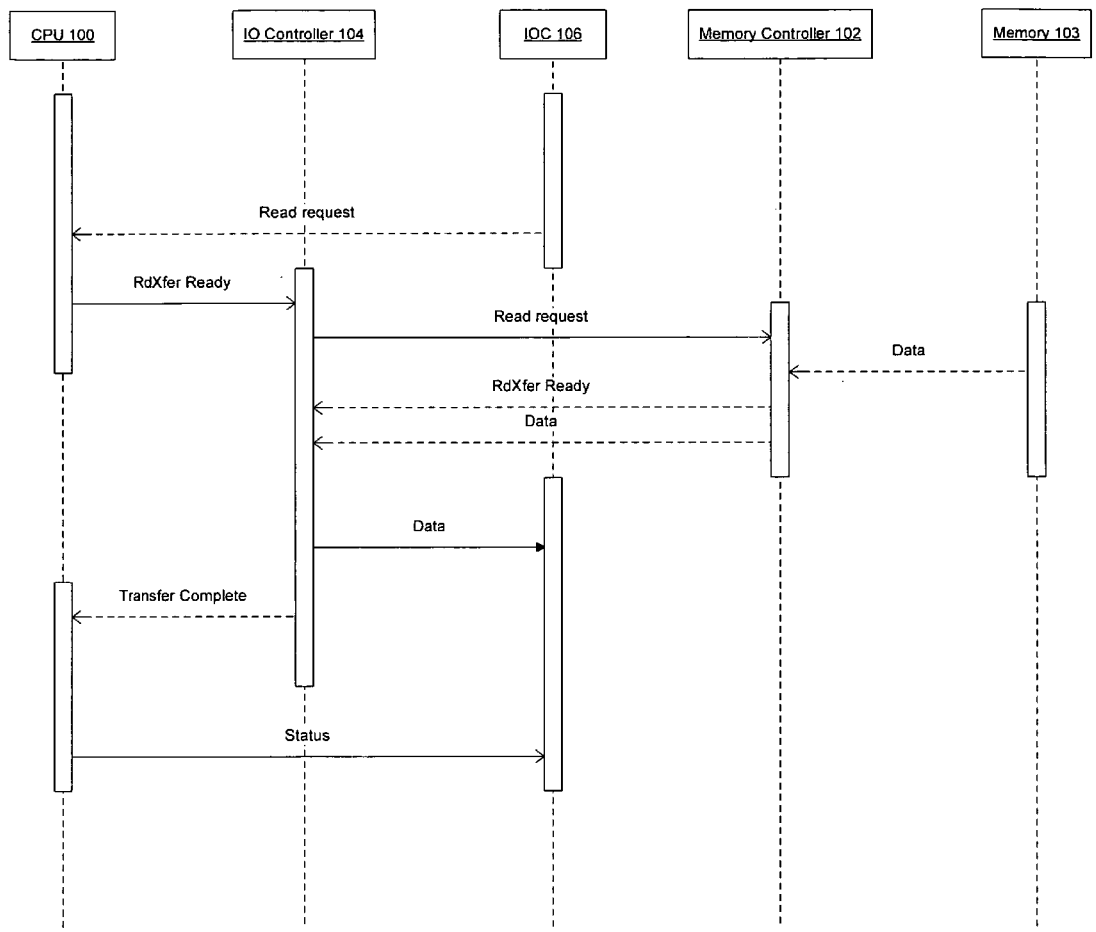
FIGS. 3a and 3b are the UML and flowchart diagrams, respectively for normal Read transfer according to prior art IO device and storage controller handshake protocol.
Figure 3B:
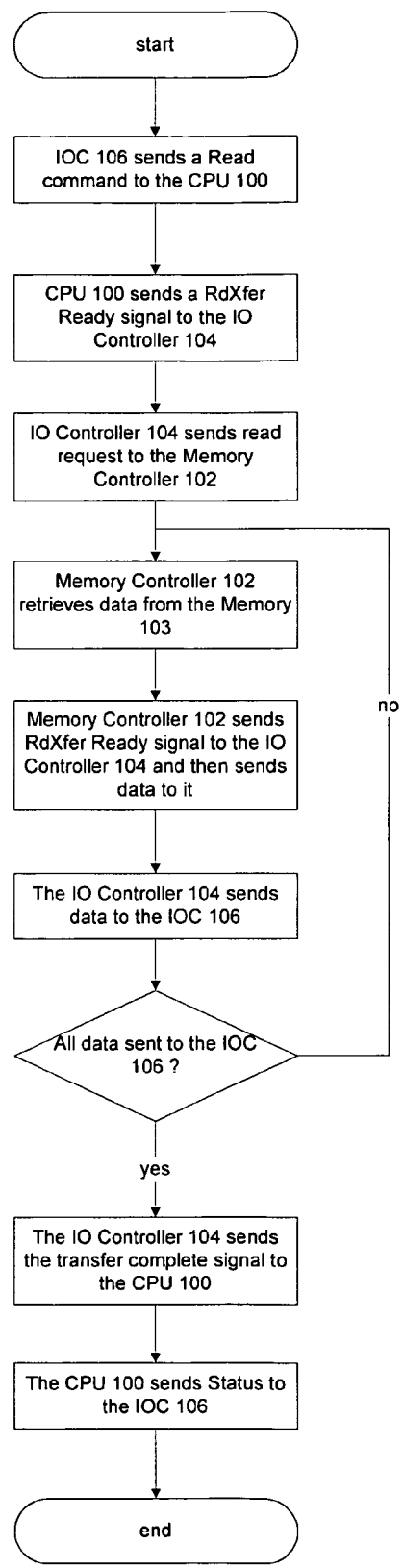

FIGS. 3a and 3b are the UML and flowchart diagrams, respectively for normal Read transfer according to prior art IO device and storage controller handshake protocol.

Figure 4A:
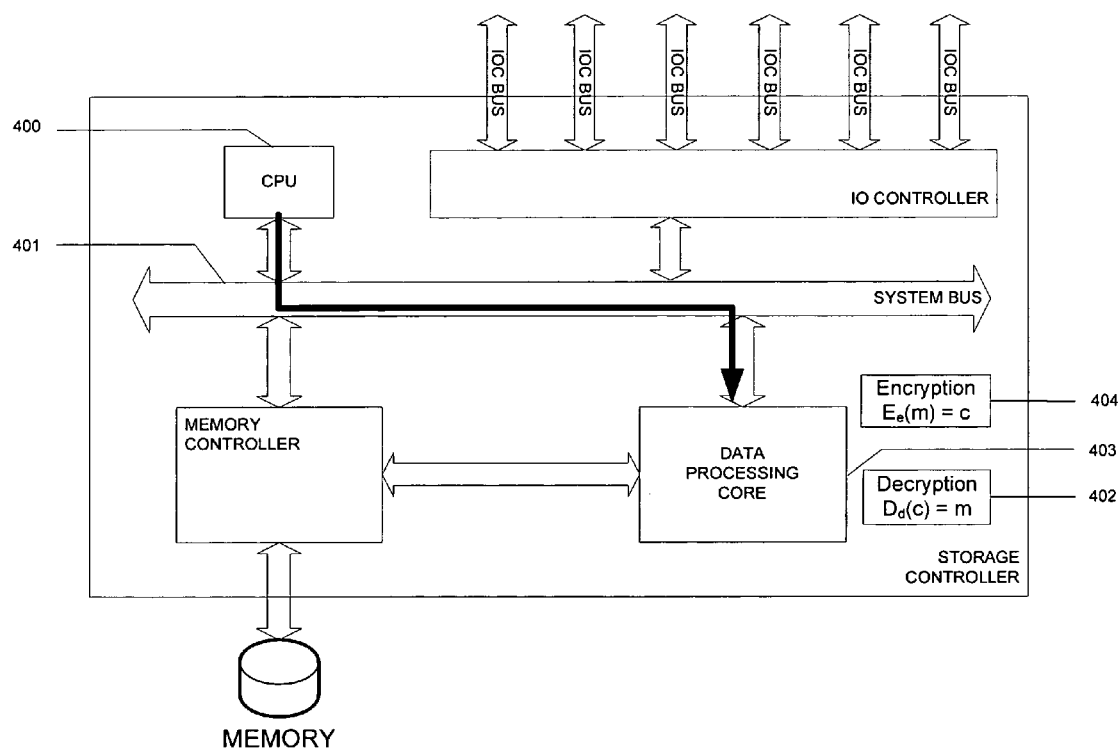
FIGS. 4a and 4b shows the normal configuration of the data processing core during initialization according to prior art IO device and storage controller handshake protocol.
Figure 4B:
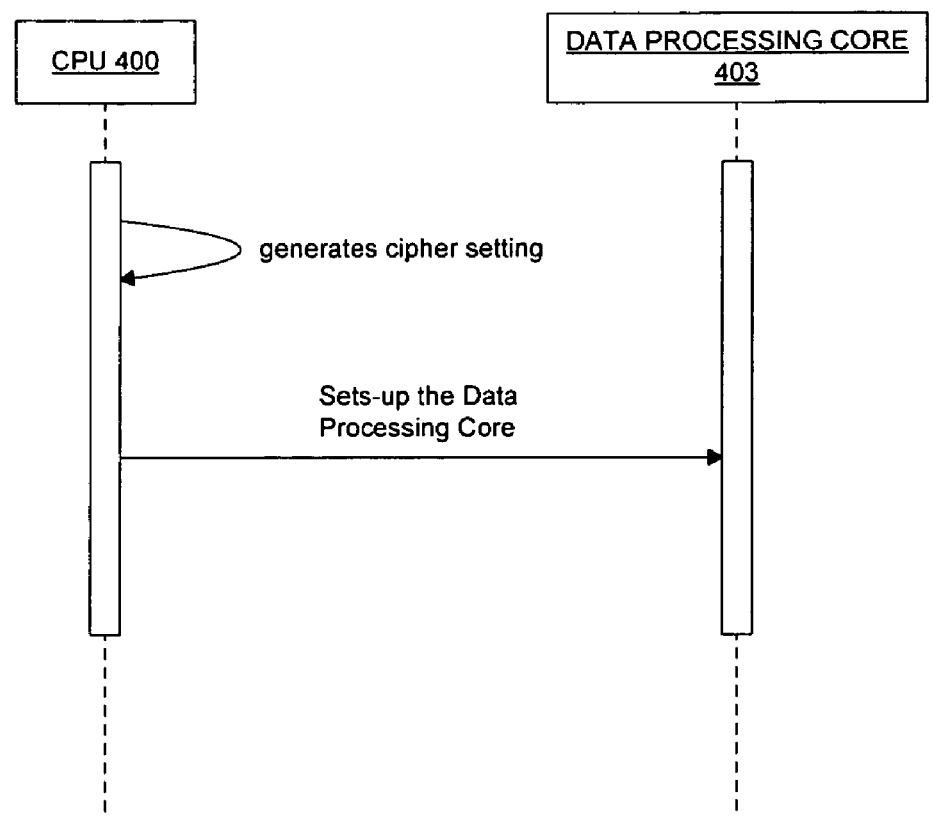

FIGS. 4a and 4b shows the normal configuration of the data processing core during initialization according to prior art IO device and storage controller handshake protocol. CPU [400] generates cipher settings. Using these settings, it sets up the Data Processing Core [403]. Hence, all data (large or small) are encrypted and/or decrypted in similar manner. Additional information regarding the data processing core can be found in the Related Patent.

Figure 5:
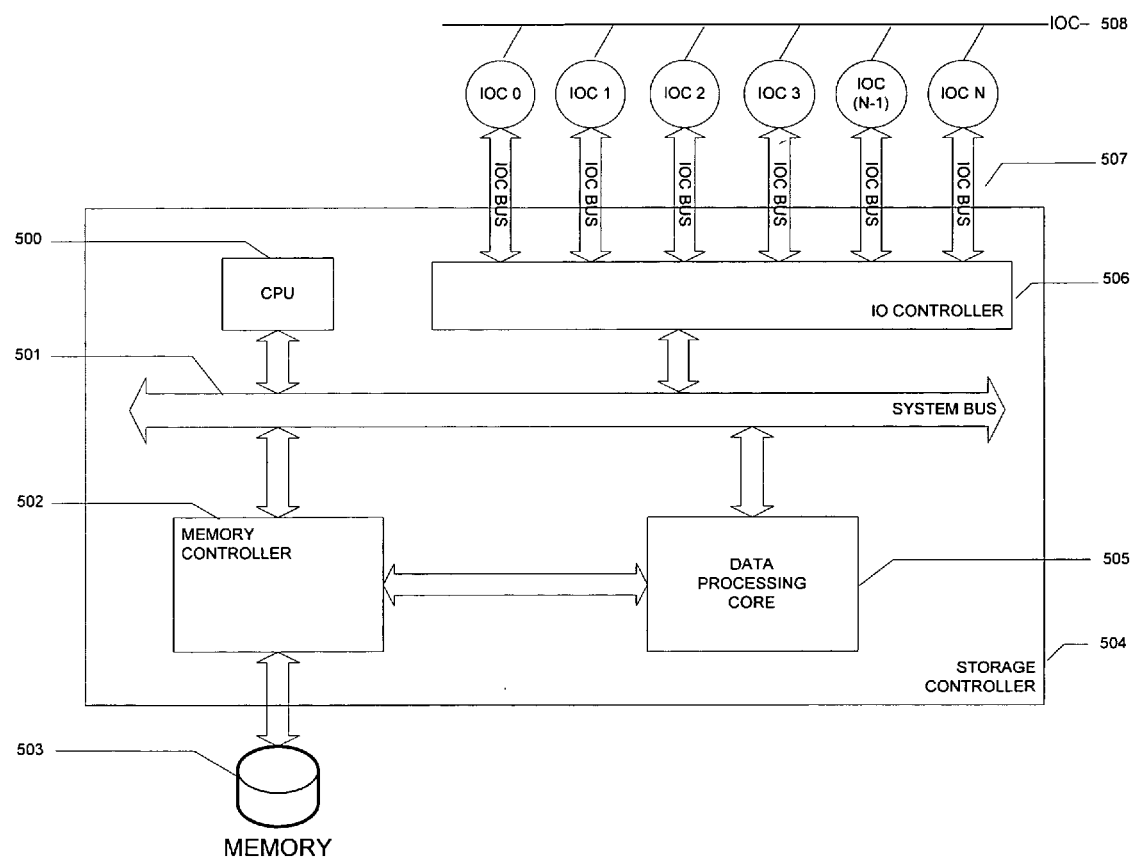
FIG. 5 shows the general architecture according to an embodiment of the present invention.

FIG. 5 shows the general architecture according to an embodiment of the present invention. The protocol of the present invention supports the architecture of FIG. 5 or any similar architecture. The architecture comprises IO devices (IOC 0 through IOC N), IO controller (IO controller), processor (CPU), data processing core, memory controller, and memory devices. IOC [508] (e.g. USB, ATA, PCI-X, U320, PATA, SAS/SATA) sends information to the storage controller [504] via the IOC bus [507]. The IO controller [506] interprets the IO commands, translates them to an op code and sends the op code to CPU [500] through the system bus [501]. The CPU [500], for this protocol, constructs the public key scheme used for encryption and/or decryption. The data processing core (DPC) [505] contains the encryption and/or decryption module. The encrypted data are written/read to/from the memory [503] through the memory controller [502]. The memory controller [502] manages the read/write requests to memory [503].

Figure 6A:
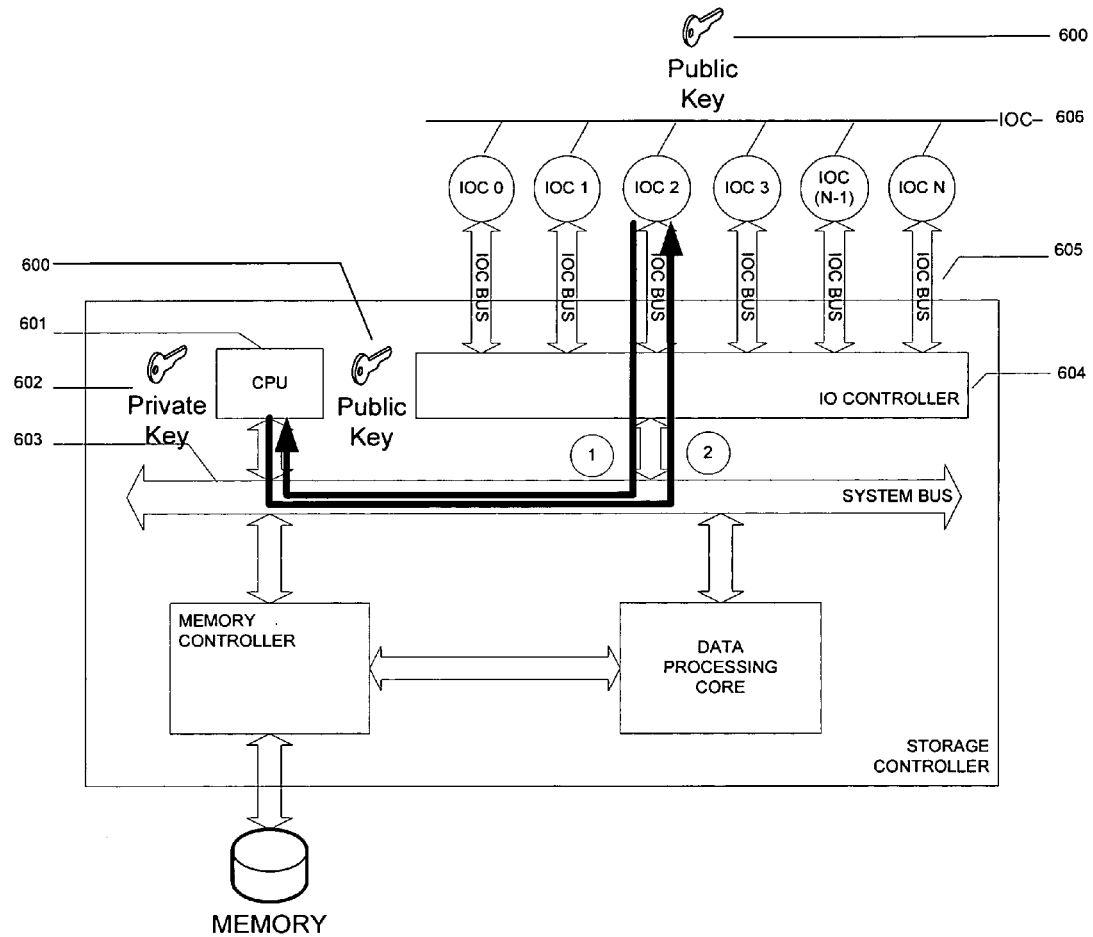
FIGS. 6a and 6b show the requesting and generation of public keys to the IO device according to an embodiment of the present invention.
Figure 6B:
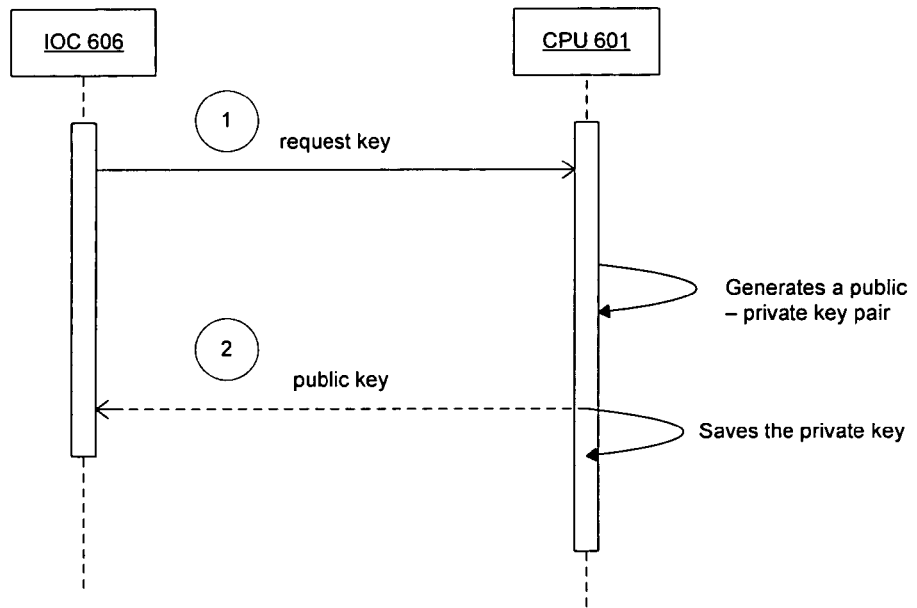
Figure 7:
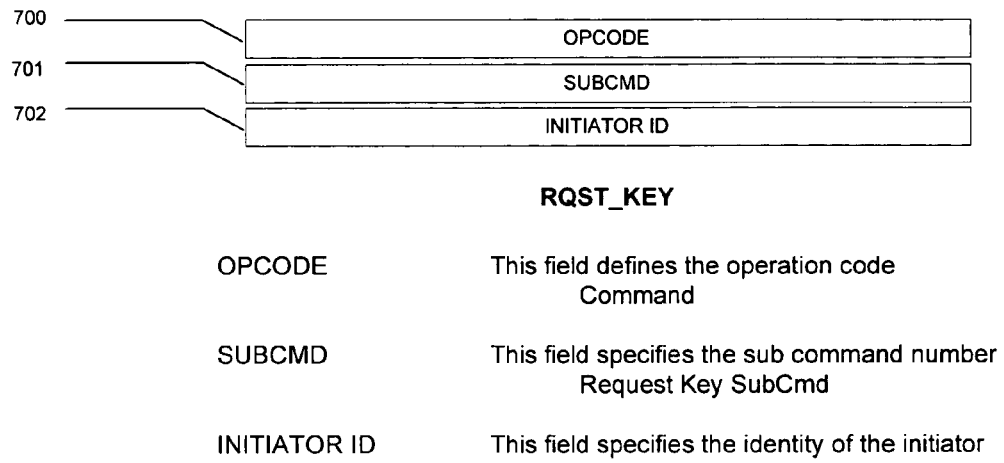
FIG. 7 shows the detail information that the IO device creates and sends to the processor when requesting the public key according to an embodiment of the present invention.

FIGS. 6a and 6b show the request for and generation of public keys to the IO device according to an embodiment of the present invention. The IOC [606] requests a public key for its session. The IOC [606] sends the RQST_KEY command of which the details are shown in FIG. 7. FIG. 7 shows the detailed information that the IO device creates and sends to the processor when requesting the public key according to an embodiment of the present invention. The RQST_KEY command comprises the following information: opcode [700], sub command [701], and initiator identification [702]. The opcode [700] is a command that defines the operation code. The sub command [701] is a sub command for public key request. The initiator identification [702] specifies the identity of the IO device. Upon receiving this information, the CPU [601] generates a fresh public-private key pair. It sends the public key to the requesting IOC [606] and momentarily saves the private key [602] for this session.

Figure 8A:
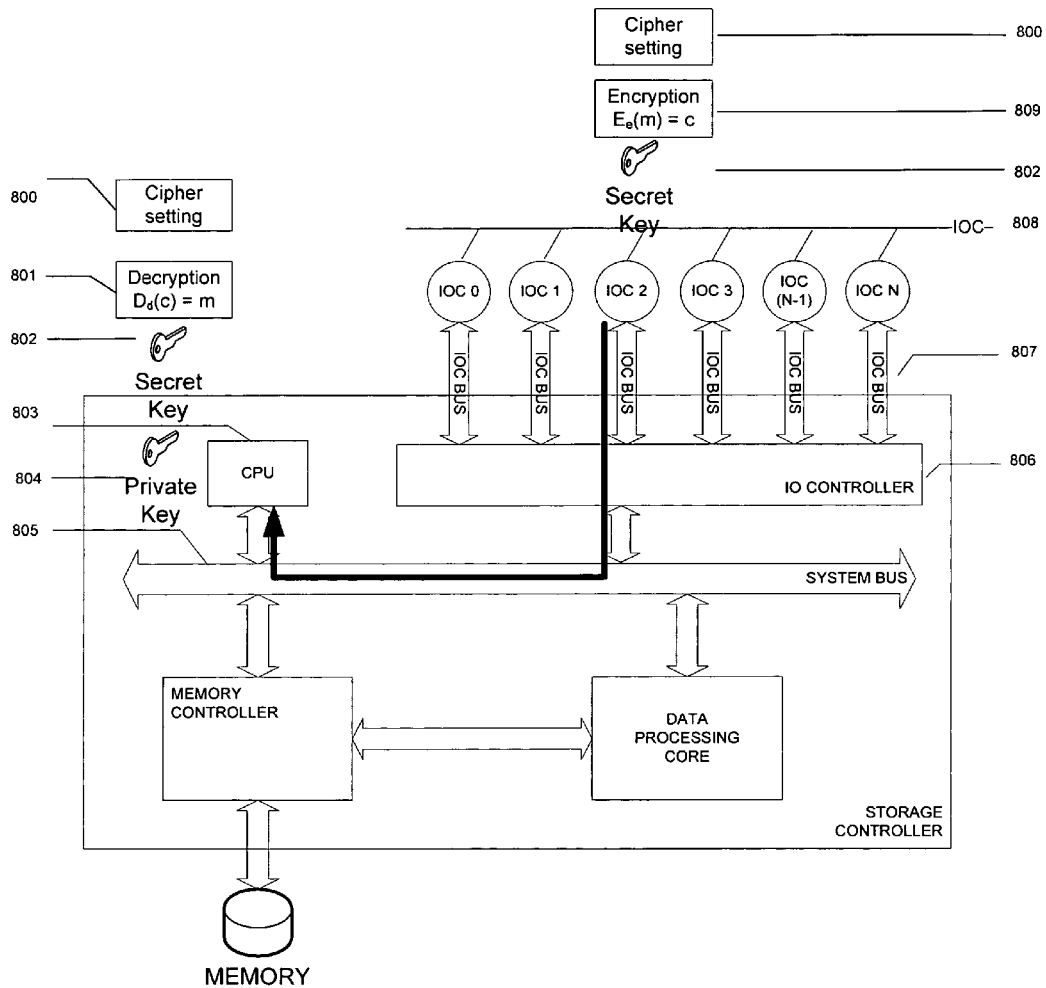
FIGS. 8a and 8b show the steps of the IO device transferring data to/from the memory according to an embodiment of the present invention.
Figure 8B:
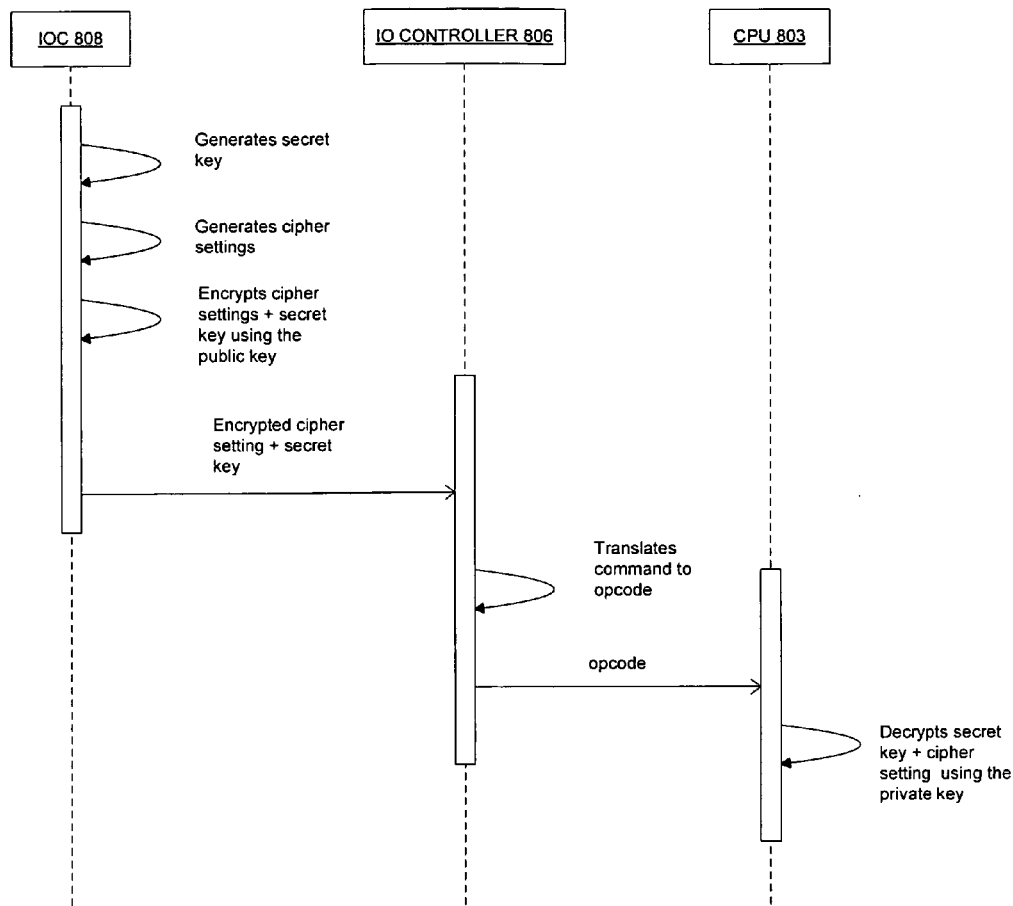

FIGS. 8a and 8b show the steps of the IO device transferring data to/from the memory according to an embodiment of the present invention. FIGS. 8a and 8b also illustrate what occurs after the IO device receives the public key. The requesting IOC [808] requesting the transfer of data to/from the memory devices generates its own secret key [802] from the public key. IOC [808] also generates its desired cipher settings [800] and all information contained in SET_CIPHER command.

FIG. 9 shows the detail information that the IO device creates when setting up the data processing core according to an embodiment of the present invention. The SET_CIPHER command illustrated in FIG. 9 comprises the following information: opcode [900], sub command [901], initiator identification [902], cipher algorithm [903], cipher mode [904], cipher key size [905], cipher key [906], and the cipher tag [907]. The opcode [900] is a command that defines the operation code. The sub command [901] is a sub command for cipher settings. The initiator identification [902] specifies the identity of the IO device. The cipher algorithm [903] identifies the type of algorithm to be used for encryption and/or decryption, e.g. AES, DES, Blowfish, etc. The cipher mode [904] identifies the type of cipher encryption or decryption to be used. The IO device has an option to use electronic codebook or an output feedback, and the like. The cipher key size [905] specifies the length of the key to be used. The key size varies depending on the cipher algorithm used. For example, when using the AES algorithm, the key size may be 128 bits, 192 bits, 256 bits or up to 1024 bits. The cipher key [906] is the secret key that is randomly generated by the IOC. The cipher tag [907] specifies the identity of these cipher settings and the cipher key (secret key). The information (specifically the cipher algorithm [903], cipher mode [904], cipher key size [905], cipher key [906] and cipher tag [907]) from the SET_CIPHER command is encrypted by IOC [808] using the public key and sent to CPU [803] via IOC bus [807]. The IO controller [806] receives the SET-CIPHER command and sends it to the CPU [803] via the system bus [805]. The CPU [803] decodes the SET-CIPHER command and recognizes that it needs to decrypt the received information. The CPU [803] decrypts the information using its private key [804]. The CPU [803] recovers the secret key [802] and the cipher setting [800].

Figure 10A:
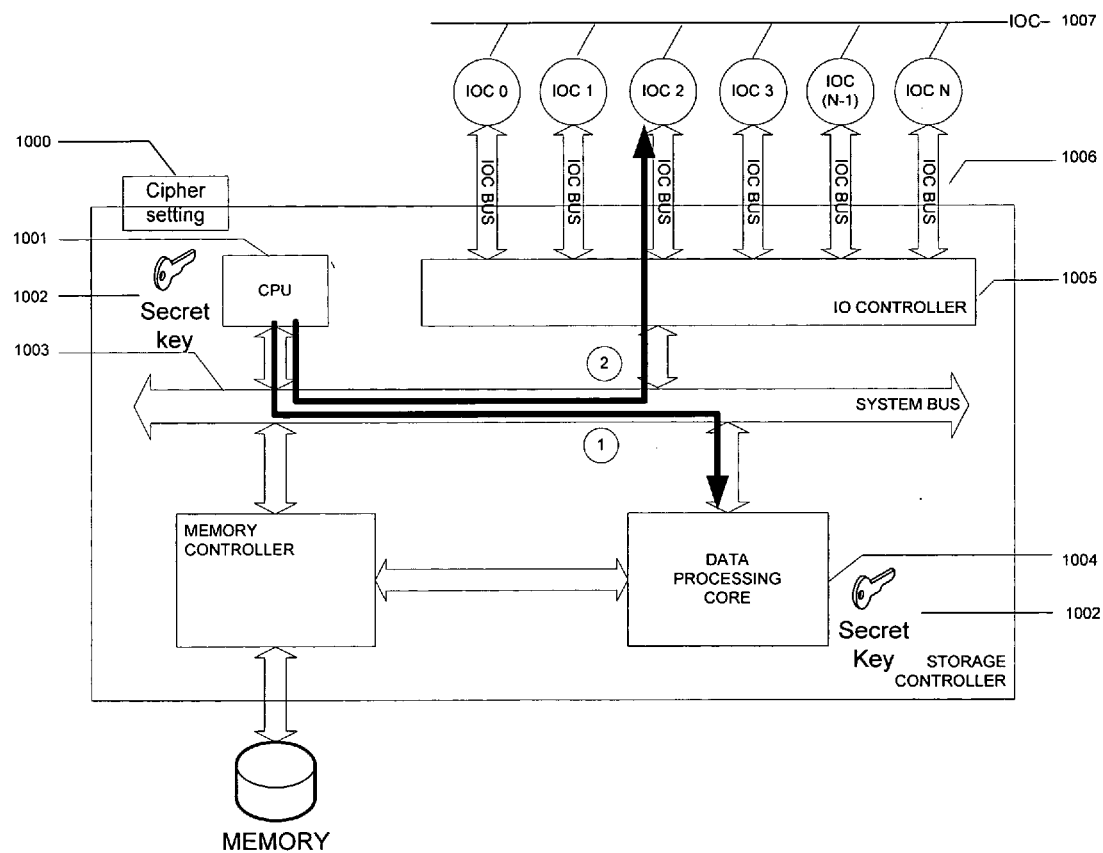
FIGS. 10a and 10b show the setting up of the data processing core and sending the ready signal to the IO device according to an embodiment of the present invention.
Figure 10B:
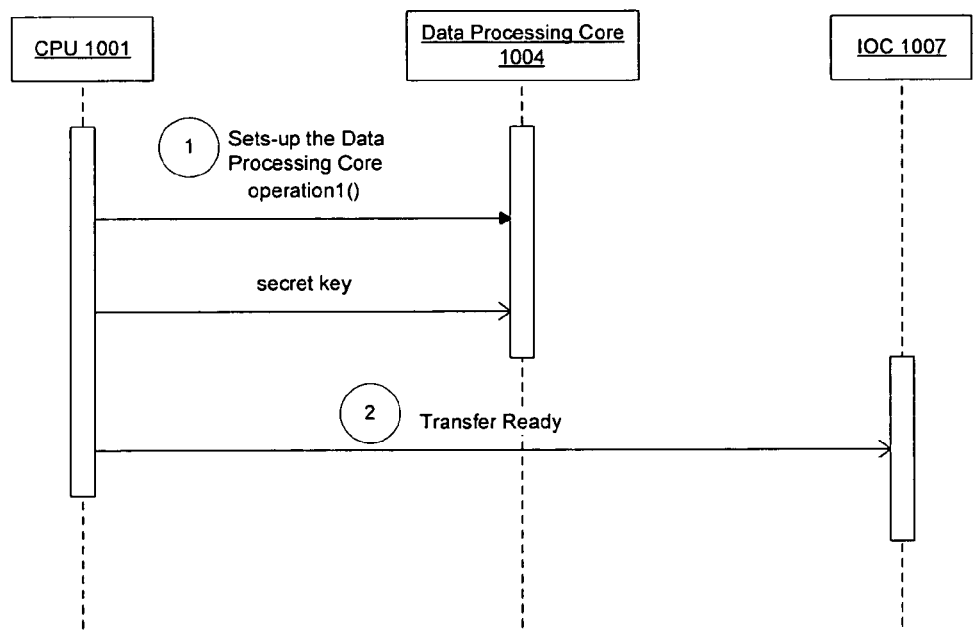

FIGS. 10a and 10b show the configuration of the data processing core and the transmission of the ready signal to the IO device according to an embodiment of the present invention. As shown in FIG. 10a, the CPU [1001] configures the DPC [1004] by using the cipher setting [1000]. After configuration, the CPU sends the secret key [1002] to the DPC [1004]. The CPU [1001] also sends the transfer ready signal to the IOC [1007]. At this point, the IOC [1007] can now send commands to the storage controller.

FIG. 11 shows the detailed information in the command block, IO_CMD command, that the IO device sends to the processor during data transfer according to an embodiment of the present invention. The IO_CMD command consists of the following information: opcode [1100], sub command [1101], initiator identification [1102], address [1103], transfer size [1104], last transfer tag [1105], cipher tag [1106], and the last use of cipher tag [1107]. The opcode [1100] is a command that defines the operation code. The sub command [1101] is a field for specifying a sub command number. Each respective sub command number specifies an IO command supported by this protocol. The type of IO commands supported by this protocol includes the Write-Encrypt, Write-Decrypt, Read-Decrypt, Read-Encrypt, Encrypt, and Decrypt commands. The initiator identification [1102] specifies the identity of the IO device. The address [1103] specifies the address of where the data is to be written or read from. The transfer size [1104] specifies the maximum size of the data to be transferred. This information is necessary for read transfers. The last transfer tag [1105] specifies whether the data being transferred is the last data. This information is necessary for write transfers. The cipher tag [1106] specifies the identity of the secret key and the cipher settings being utilized during data transfers. The last use of cipher tag [1107] specifies whether upon sending this command, the cipher key and cipher setting tagged in cipher tag [1106] is used last. The cipher tag [1106] and the last transfer tag [1105] are used in key management. Encryption and/or decryption stage occurs during the data phase where the data is either encrypted or decrypted depending on the issued command.

Figure 12A:
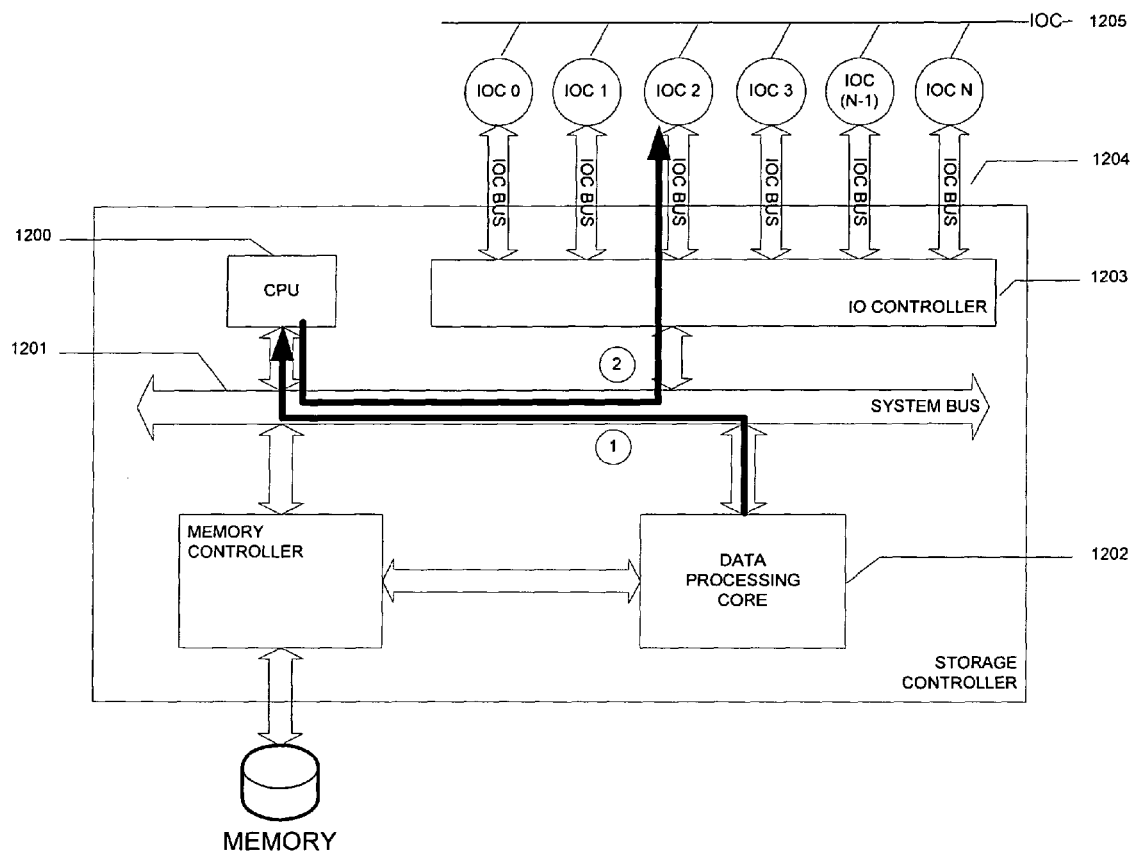
FIGS. 12a and 12b show the data processing core sending a transfer complete signal to the processor and the processor sending a status signal to the IO device according to an embodiment of the present invention.
Figure 12B:
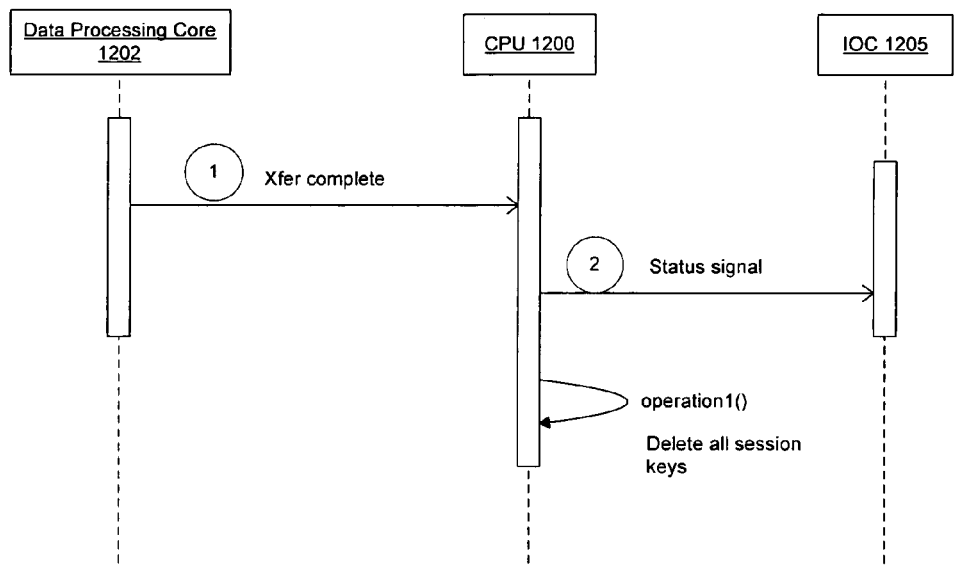

FIGS. 12a and 12b show the data processing core sending a transfer complete signal to the processor and the processor sending a status signal to the IO device according to an embodiment of the present invention. The DPC [1202] sends a Transfer Complete signal to the CPU [1200]. The CPU [1200] then sends a Status signal to the IOC [1205]. After this session, all the keys (public-private key pair and secret key) are deleted from the memory. For the next session, a new public-private key pair is generated. A session is said to be the end if the last transfer tag [1105] of FIG. 11 is set. Part of the protocol of the present invention is the management of secret keys. It is possible that there is one secret key used for all the commands in every session (scenario 1). It is also possible that in a session, there is an associated secret key per command (scenario 2). Furthermore, it is also possible that per session, there are groups of commands using different secret keys (scenario 3). That is, group 1 uses secret key A, group 2 uses secret key B; and groups 1 and 2 consist of more than one command. This is where key management takes its role of when the session keys (public-private key pair and secret key) are deleted. In general, public-private key is always fresh per session; so this key pair is always deleted after every session. As stated, a session is said to be finished when the field last transfer tag [1105] of IO_CMD command (of FIG. 11) is set to 1 upon sending this IO_CMD command.

Figure 13:
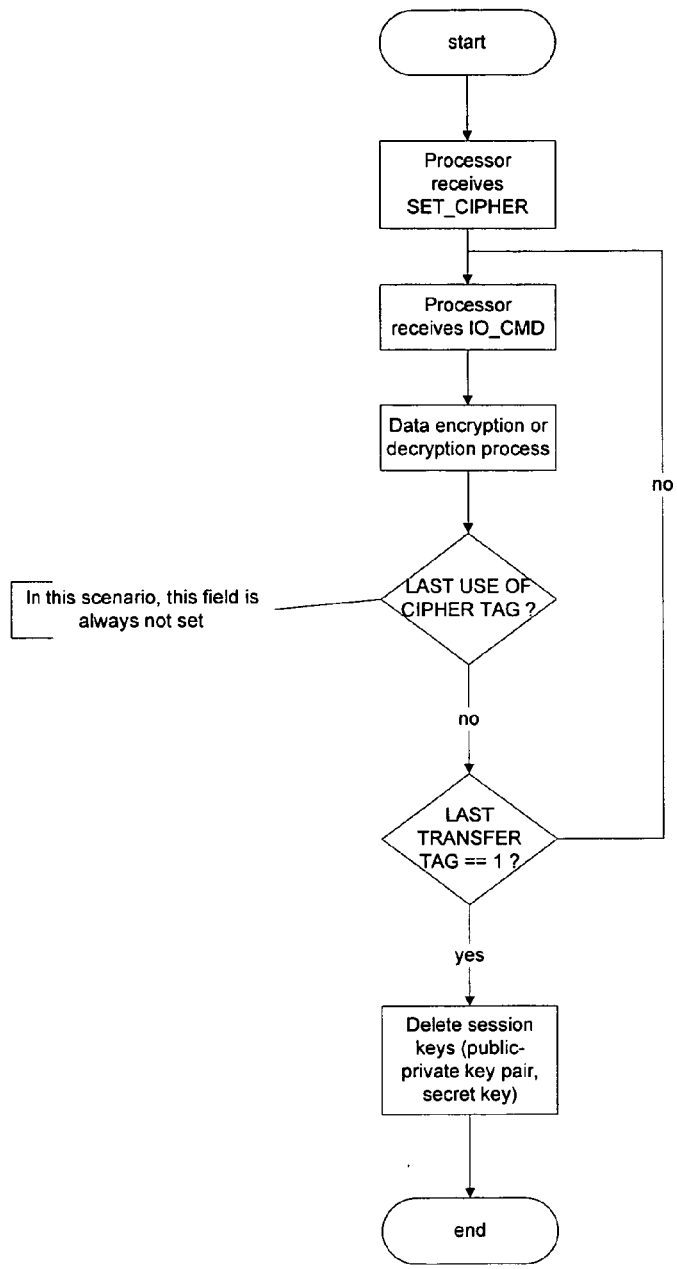
FIG. 13 is a flowchart that shows the key management with one secret key for all the commands in every session according to an embodiment of the present invention.

FIG. 13 is a flowchart that shows the key management with one secret key for all the commands in every session according to an embodiment of the present invention. The processor receives the SET_CIPHER (of FIG. 9) command. After the handshaking, the IO device is ready to send commands. The processor receives the IO_CMD command (of FIG. 11) from the IO device that requests to transfer data to/from the memory. After the command phase, data phase (encryption or decryption of data) takes place, followed by the status phase. After the status phase of this IO_CMD command process, the processor checks if this process is the last to use the secret key by monitoring the last use of cipher tag [1107]. For this scenario, this field is always not set. Furthermore, the processor checks if this command is the last for this session by monitoring the last transfer tag [1105]. If this field is set, then all the session keys, i.e. the public-private key pair and secret key, are deleted; otherwise, the processor will retain these keys. The secret key and its associated cipher settings will be used for other data transfer process or IO_CMD command received from the IO device.

Figure 14:
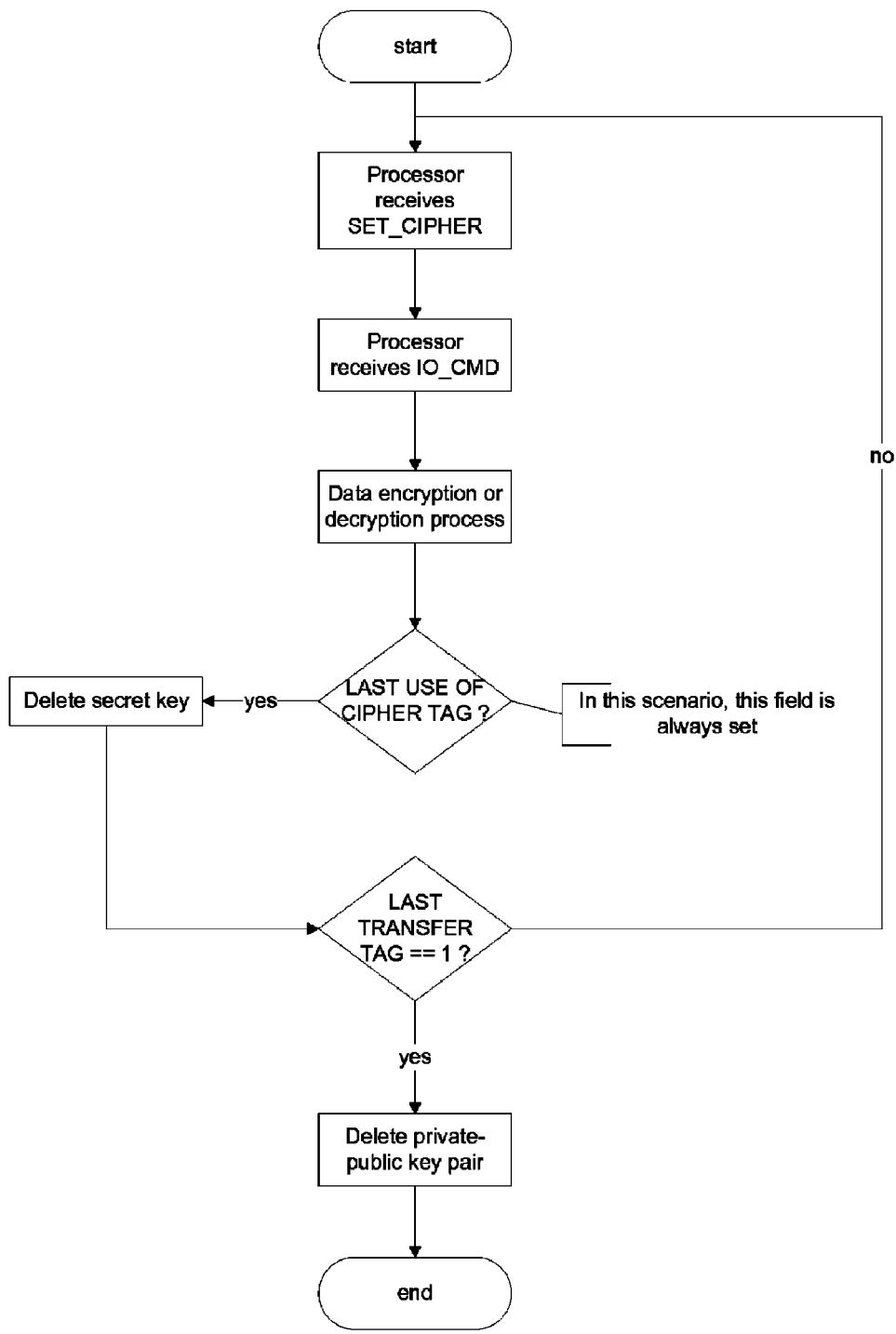
FIG. 14 is a flowchart that shows the key management with an associated secret key per command in a session according to an embodiment of the present invention.

FIG. 14 is a flowchart that shows the key management with an associated secret key per command in a session according to an embodiment of the present invention. The processor receives SET_CIPHER (of FIG. 9) command. After the handshaking, the IO device is ready to send commands. The processor receives the IO_CMD command (of FIG. 11) from the IO device that requests to transfer data to/from the memory. After the command phase, data phase (encryption or decryption of data) takes place, followed by the status phase. After the status phase of this process with the IO_CMD command, the processor checks if this process is the last to use the secret key by monitoring the last use of cipher tag [1107]. For this scenario, this field is always set. Hence, the processor deletes the secret key used for this IO_CMD command and further checks if this process is the last for this session by monitoring the last transfer tag [1105]. If this field is set, then the public-private key pair is deleted; otherwise, the processor will retain the public-private key pair.

Figure 15:
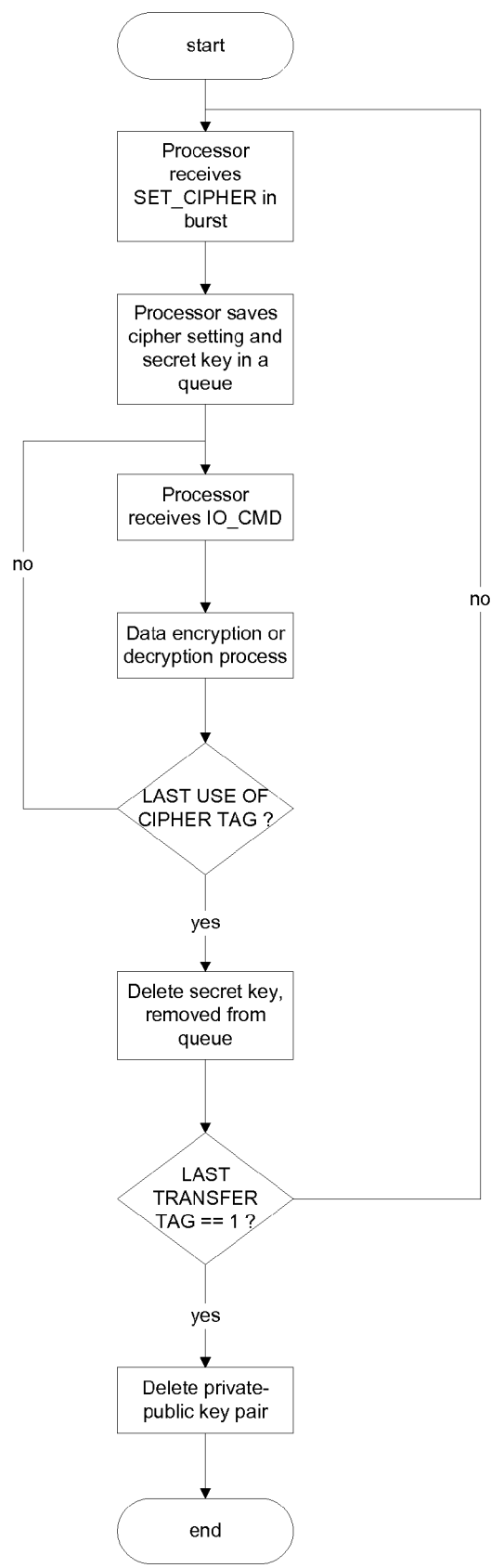
FIG. 15 is a flowchart that shows the key management with groups of commands using different secret key per session according to an embodiment of the present invention.

FIG. 15 is a flowchart that shows the key management with groups of commands using different secret key per session according to an embodiment of the present invention. The processor receives in bursts the SET_CIPHER (of FIG. 9) command. The processor saves the secret key and cipher settings associated with each SET_CIPHER command in a queue. Then after the handshaking when the IO device is ready to send commands, the processor receives the IO_CMD command from the IO device that requests to transfer data to/from the memory. After the command phase, data phase (encryption or decryption of data) takes place, followed by the status phase. After the status phase of this process with the IO_CMD command, the processor checks if this process is the last to use the secret key by monitoring the last use of cipher tag [1107] field of the IO_CMD command. If this field is not set the processor continues to use same secret key and cipher setting for encryption/decryption of incoming the IO_CMD command; otherwise, the processor deletes the secret key and its associated cipher setting and removes them from the queue. Furthermore, the processor checks if the process associated with a certain IO_CMD command is the last for this session by monitoring the last transfer tag [1105] of IO_CMD command. If this field is set, then the public-private key pair is deleted; otherwise, the processor will retain the public-private key pair.

Figure 16:
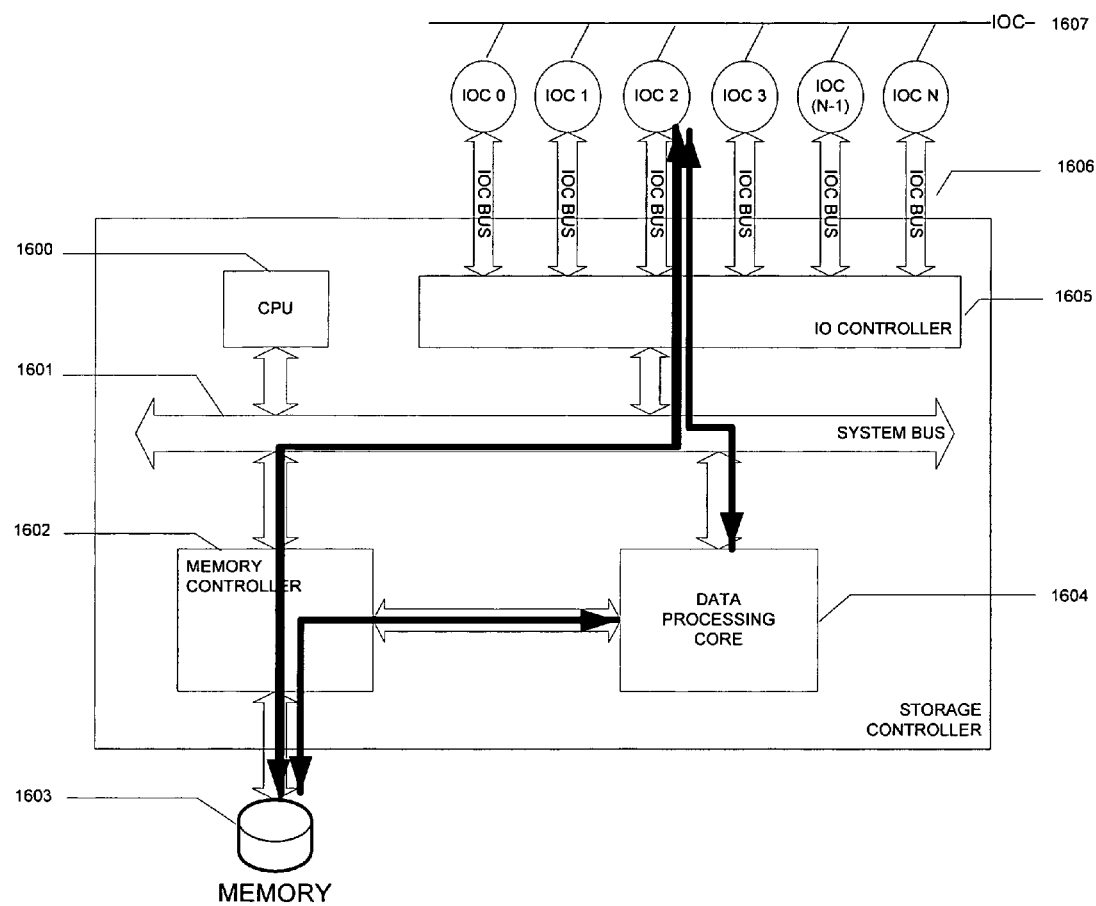
FIG. 16 shows the general architecture illustrating the different scenarios supported by this protocol according to an embodiment of the present invention.
Figure 17A:
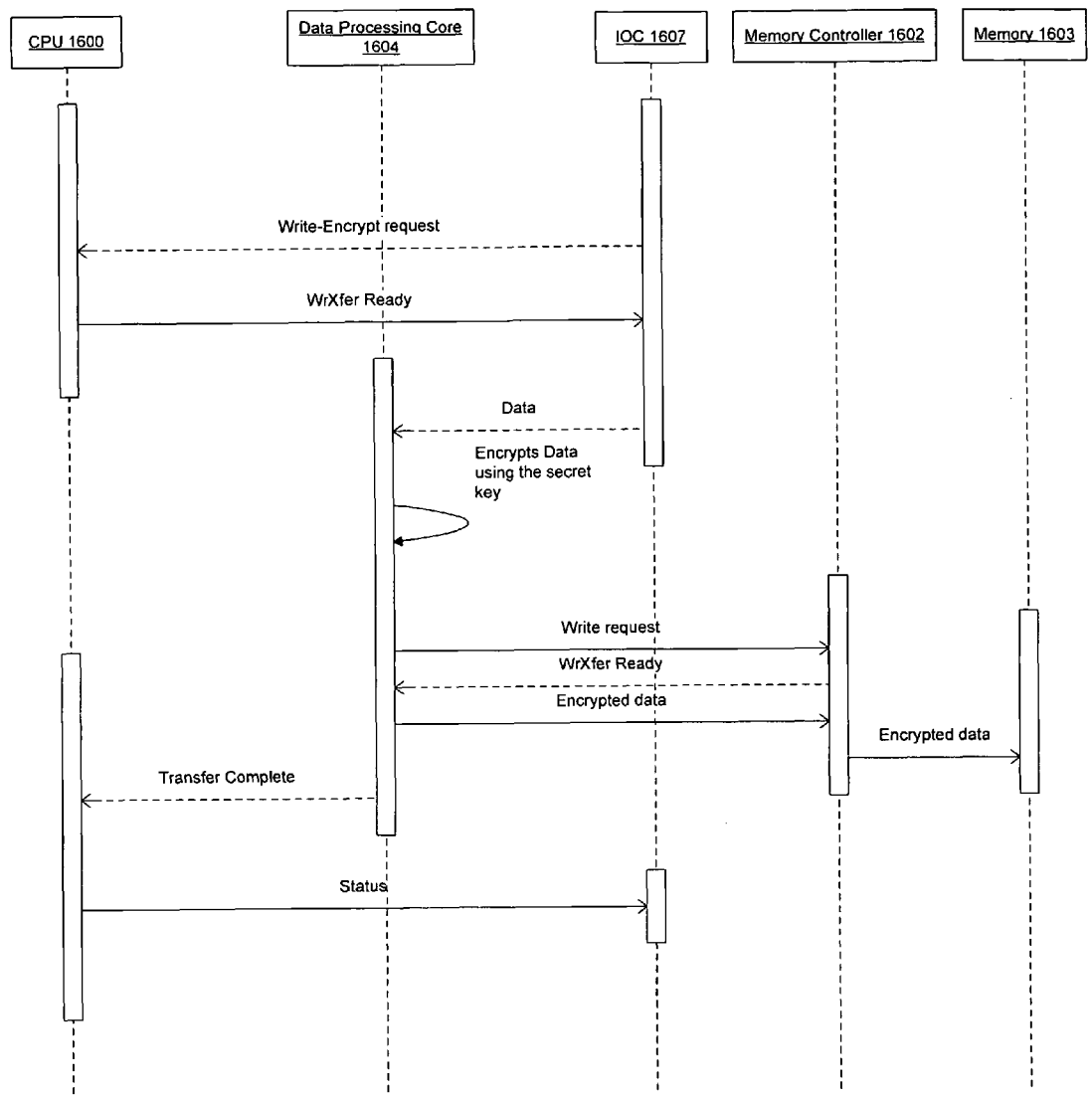
FIGS. 17a and 17b show a Write-Encrypt scenario according to an embodiment of the present invention.
Figure 17B:
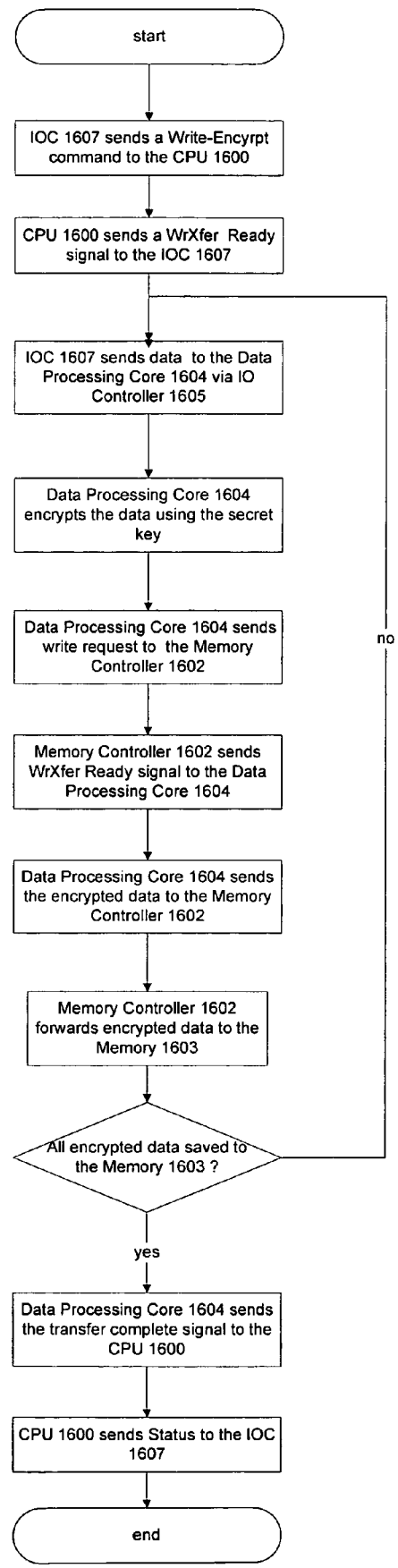
Figure 18A:
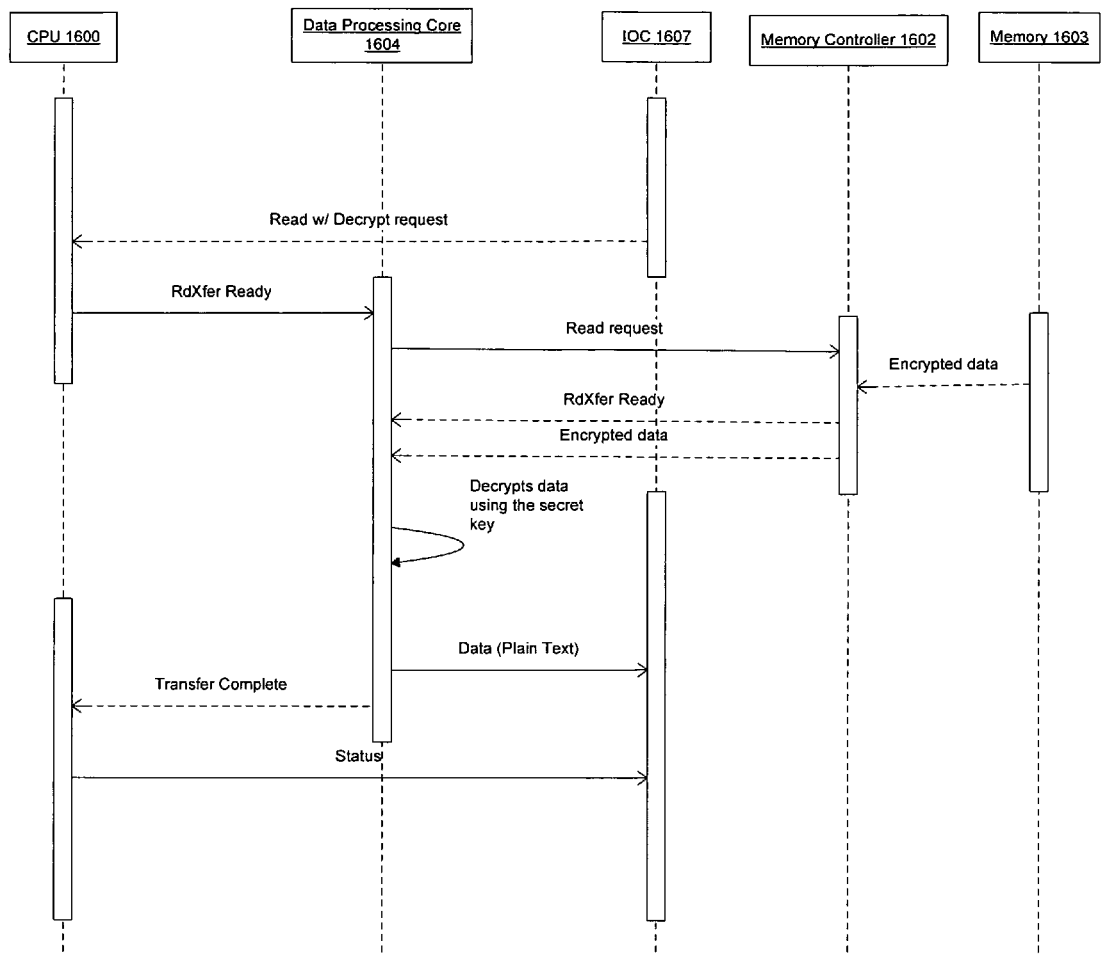
FIGS. 18a and 18b show a Read-Decrypt scenario according to an embodiment of the present invention.
Figure 18B:
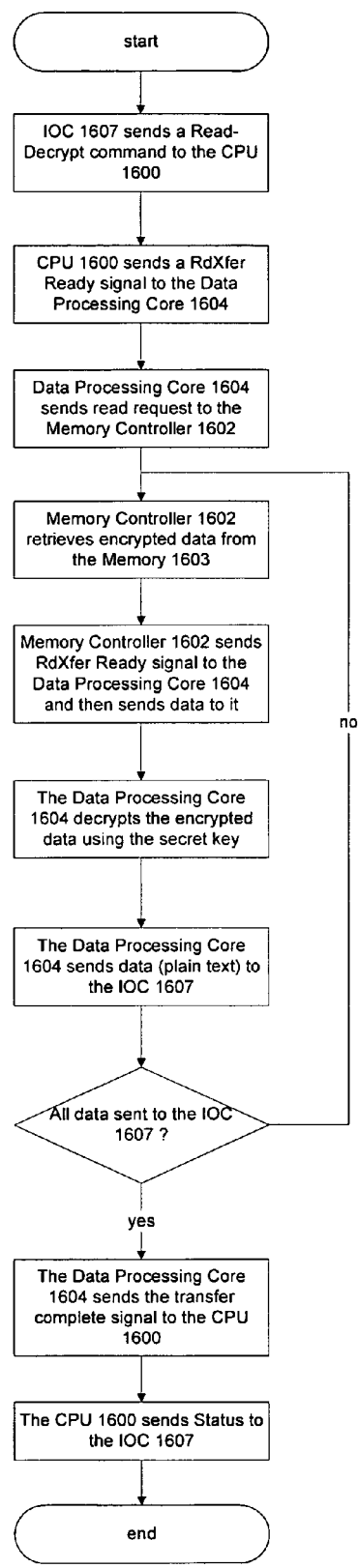
Figure 19A:
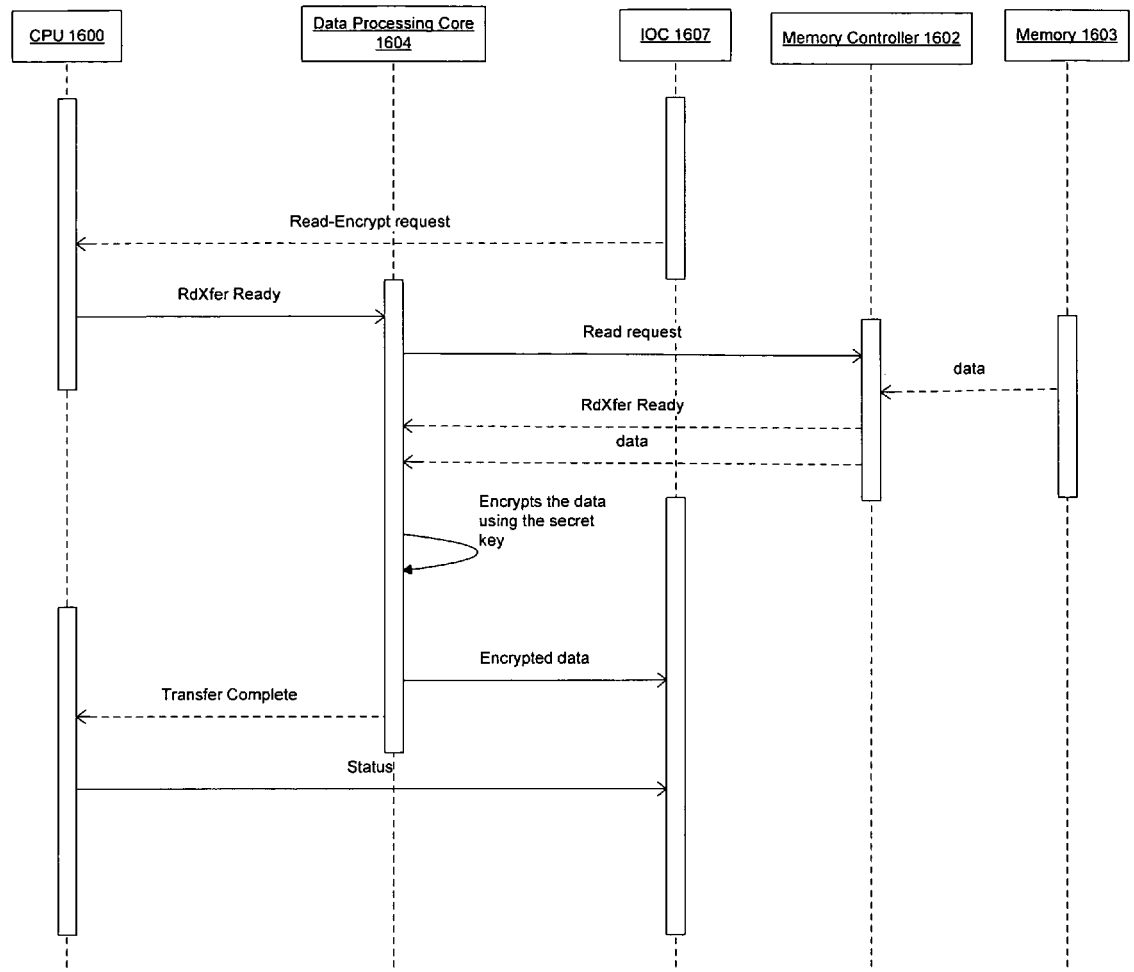
FIGS. 19a and 19b show the Read-Encrypt scenario according to an embodiment of the present invention.
Figure 19B:
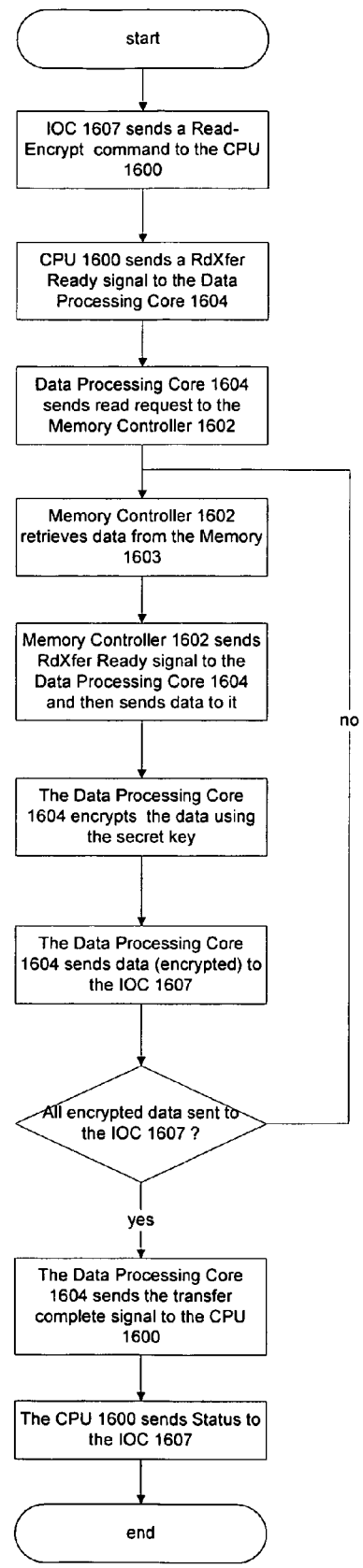
Figure 20A:
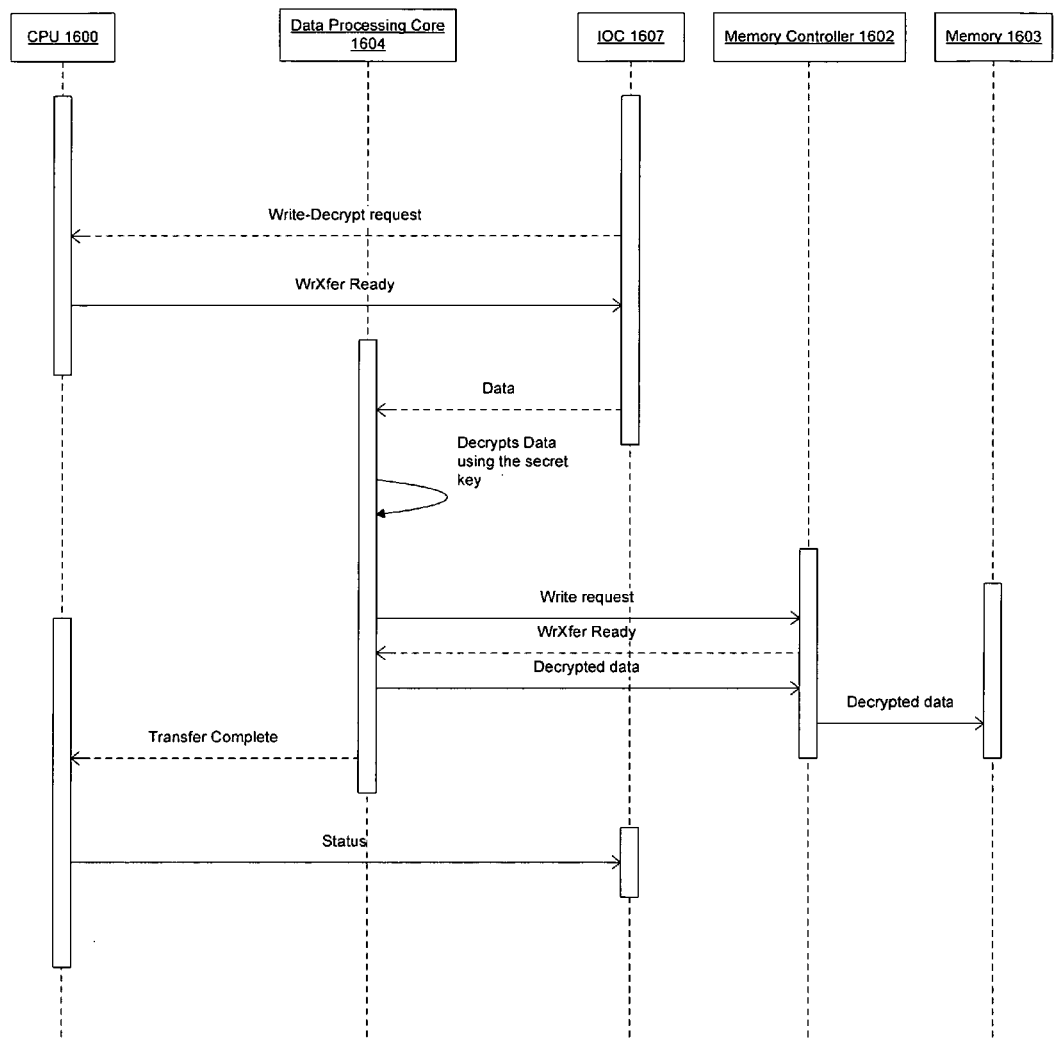
FIGS. 20a and 20b show the Write-Decrypt scenario according to an embodiment of the present invention.
Figure 20B:
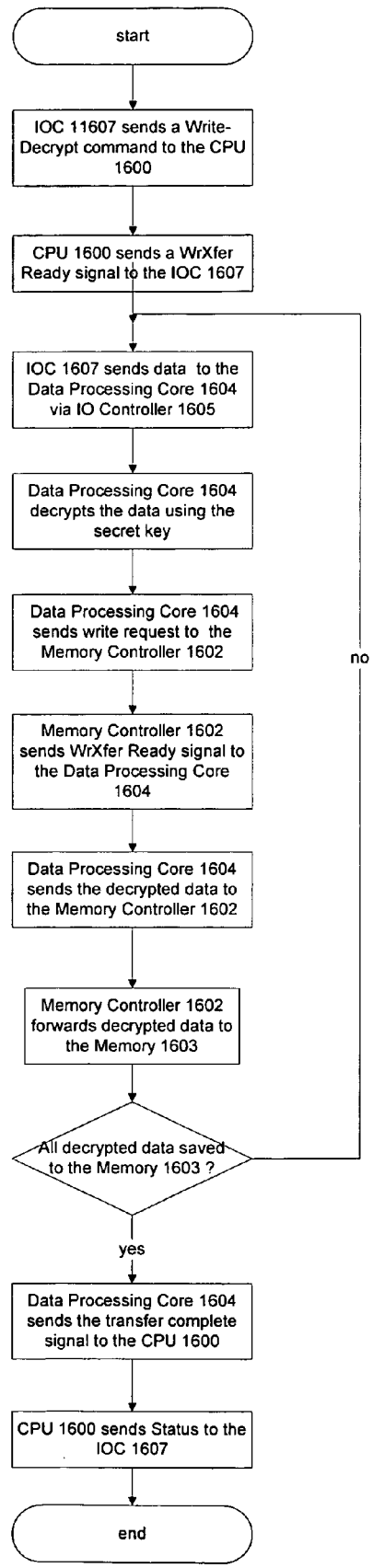
Figure 21A:
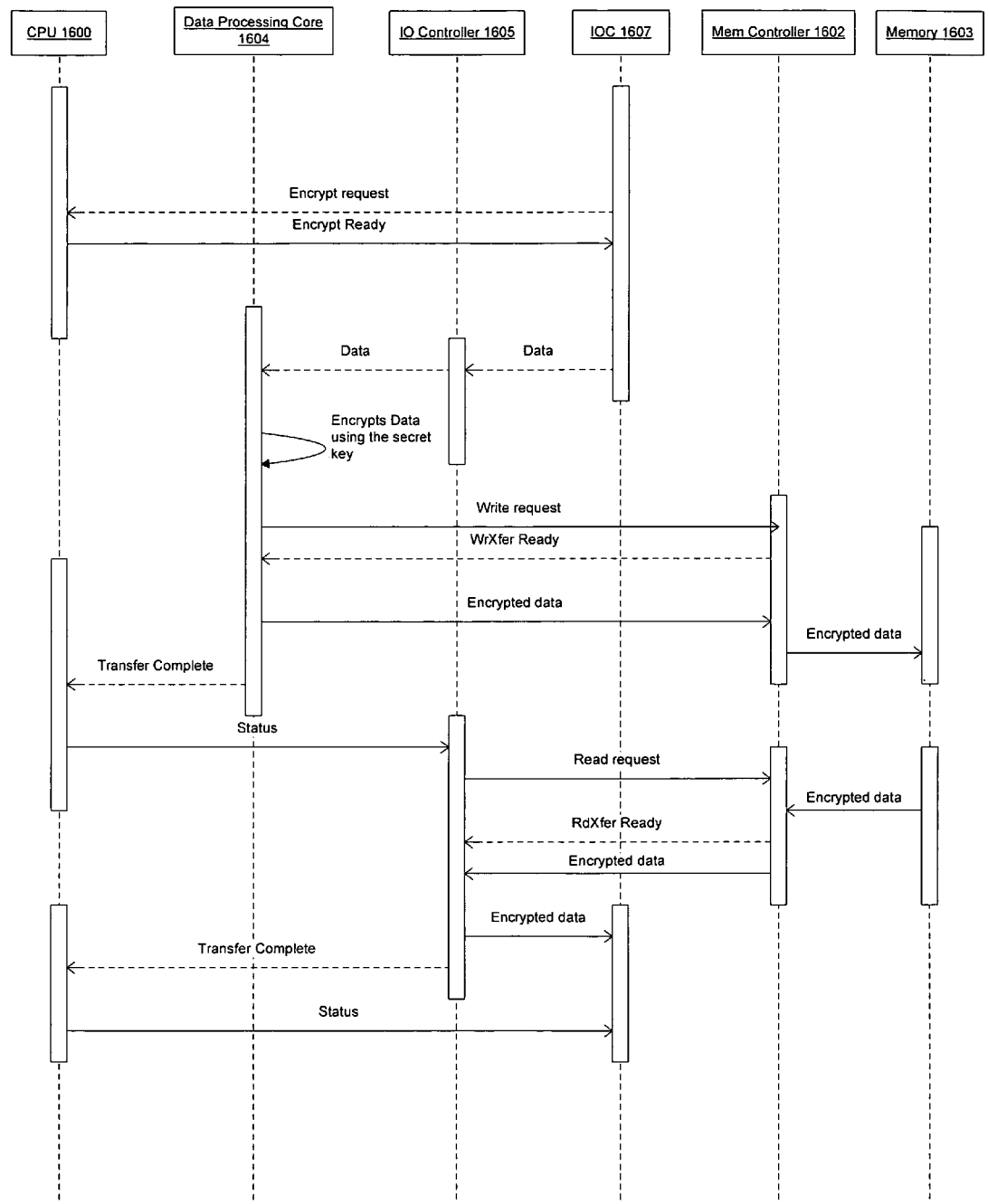
FIGS. 21a and 21b show the Encrypt scenario according to an embodiment of the present invention.
Figure 21B:
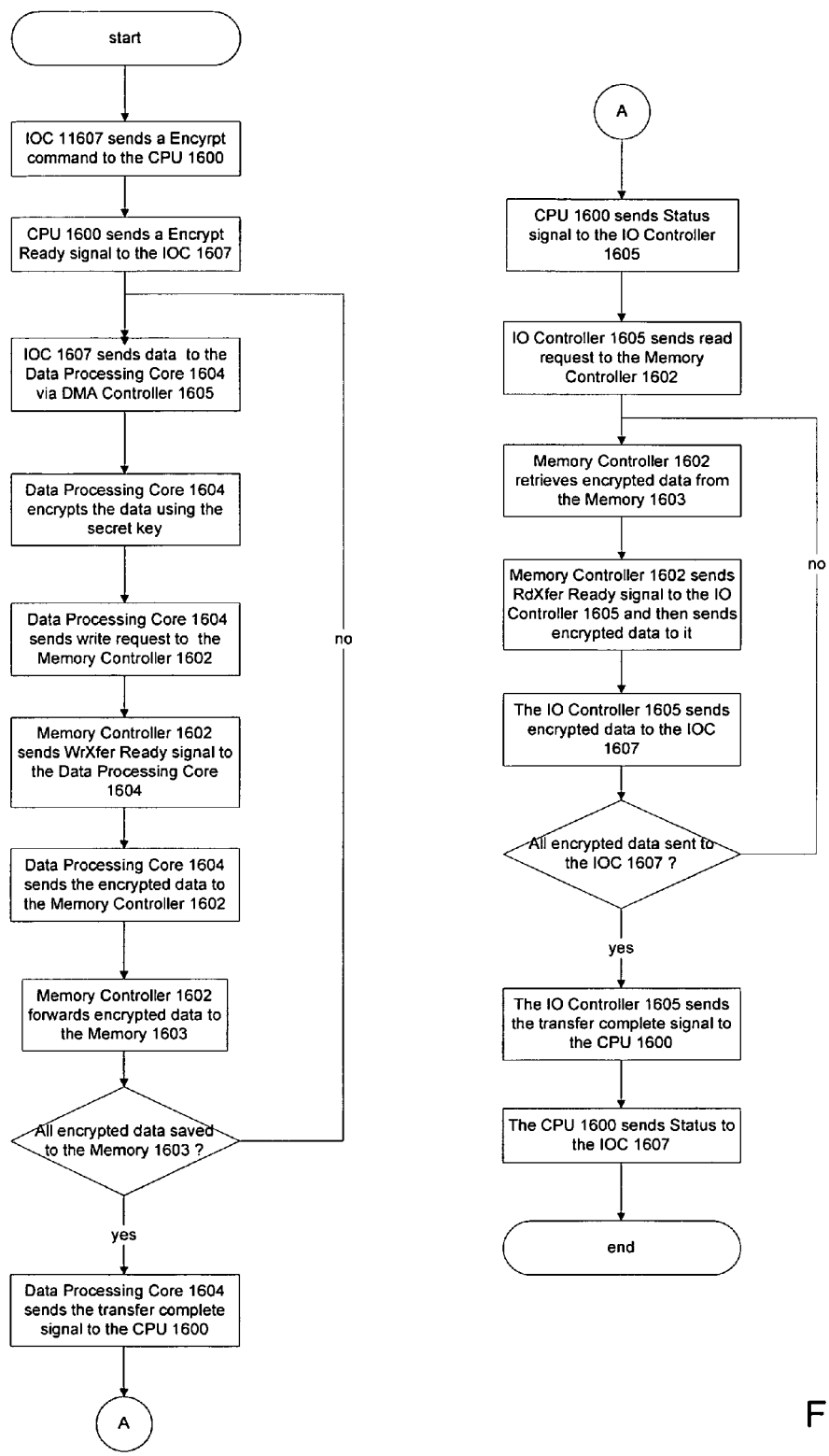
Figure 22A:
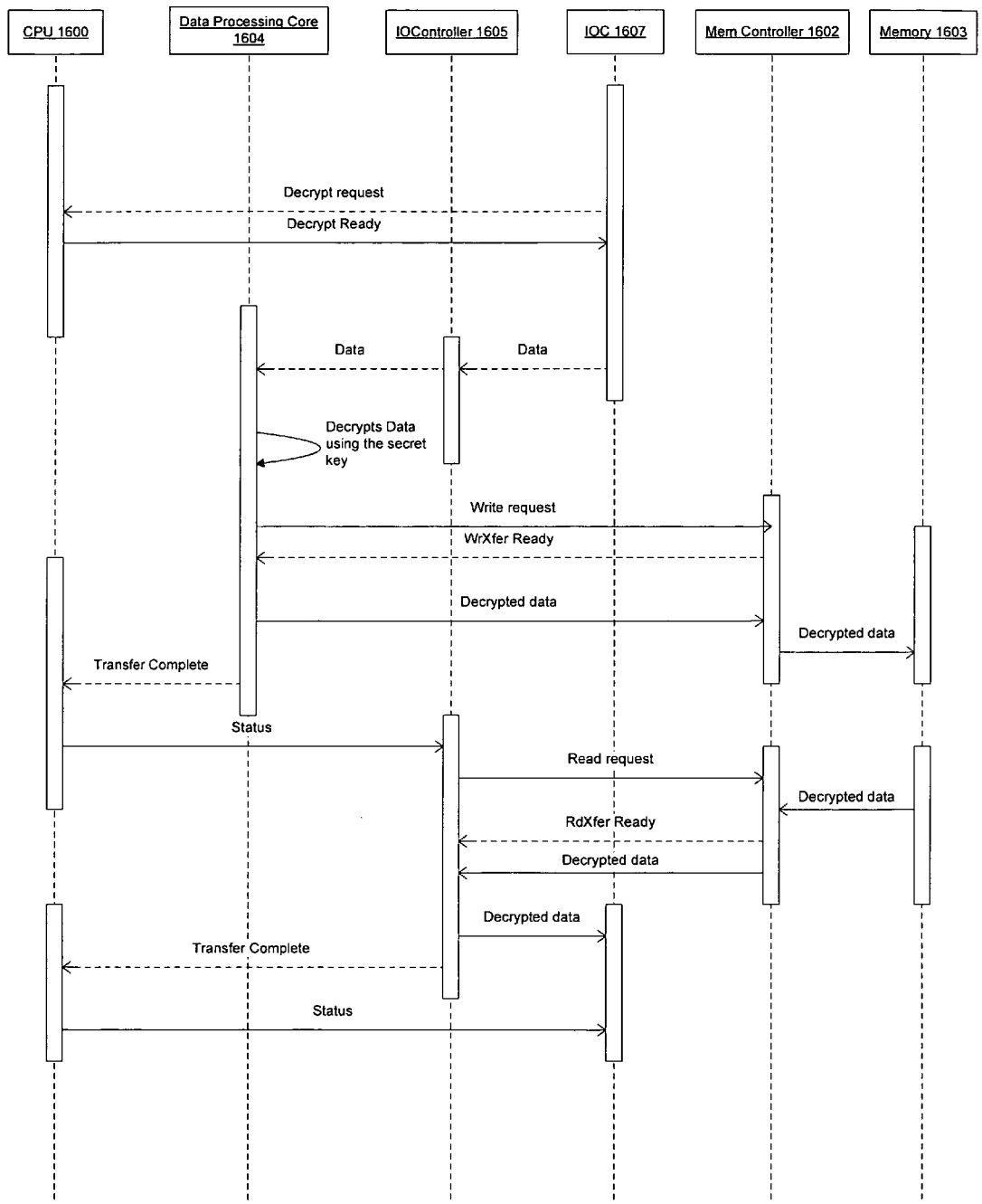
FIGS. 22a and 22b show the Decrypt scenario according to an embodiment of the present invention.
Figure 22B:
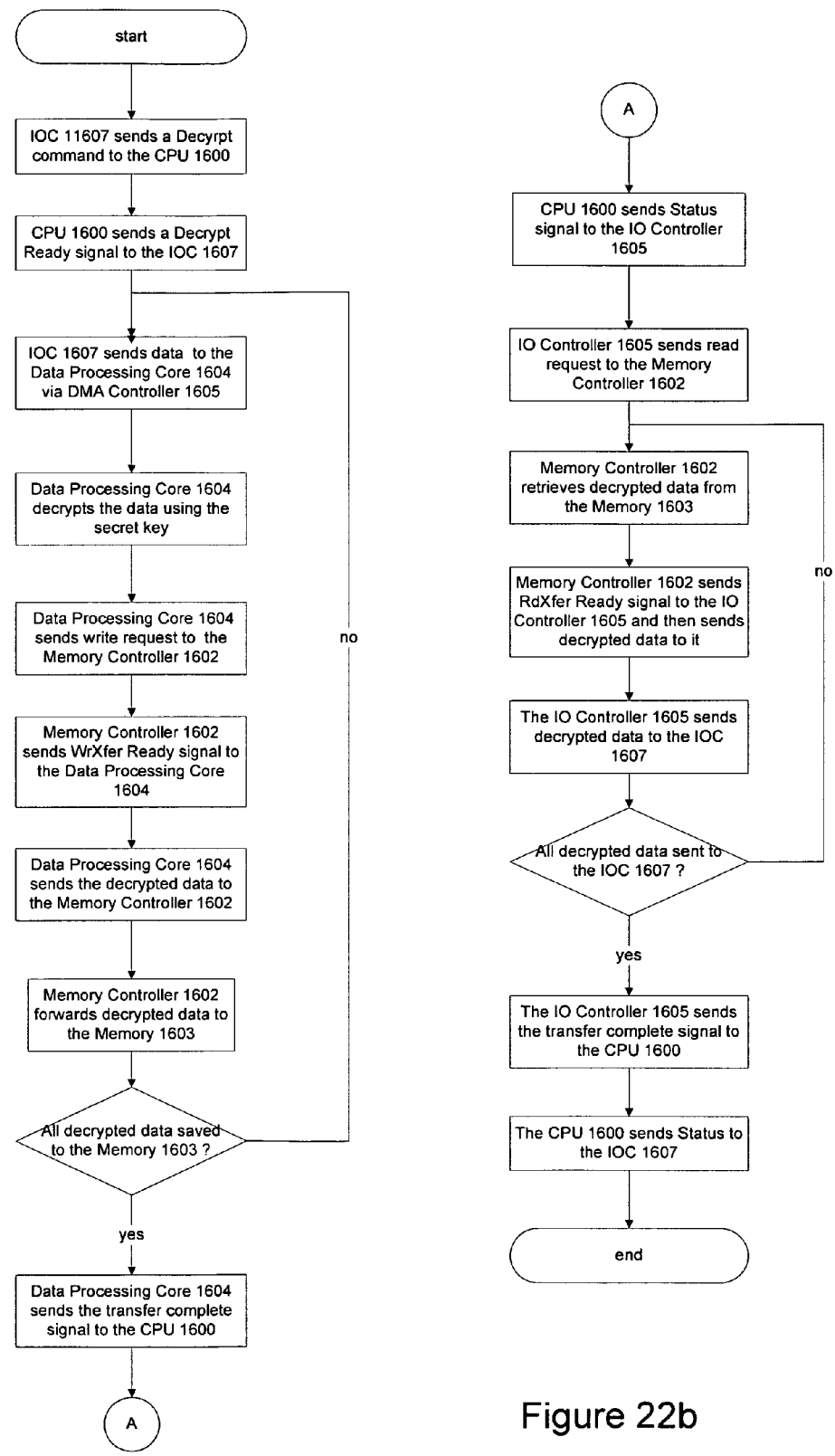

The following scenarios serve as exemplary implementation of an embodiment of the present invention. The IO device may or may not request a public key once the session is already set but it is mandatory that during encryption and/or decryption, the secret key and the cipher settings are present. The figures are referenced for the different scenarios. FIG. 16 is the referenced diagram for the discussions. FIGS. 17a and 17b show a Write-Encrypt scenario. FIGS. 18a and 18b show a Read-Decrypt scenario. FIGS. 19a and 19b show the Read-Encrypt scenario. FIGS. 20a and 20b show the Write-Decrypt scenario. FIGS. 21a and 21b show an Encrypt scenario. FIGS. 22a and 22b show a Decrypt scenario. FIGS. 2a and 2b show the prior art normal write. FIGS. 3a and 3b show the prior art normal read scenario.

Secured Storage System is Used to Store Data from the Input-Output Device in Encrypted Form FIGS. 17a and 17b show a Write-Encrypt scenario according to an embodiment of the present invention. IOC [1607] sends a Write-Encrypt command to the CPU [1600]. CPU [1600] responds to the IOC [1607] with a write transfer ready signal. After the command phase, the IOC [1607] sends the data to be encrypted via the IO controller [1605] for its data phase. The IO controller [1605] can directly send this data to the DPC [1604] without the intervention of the CPU [1600]. The DPC [1604] with its secret key encrypts the data. This encrypted data is sent to the memory controller [1602] by first sending a write request to it. The memory controller [1602] responds with a write transfer ready signal to the DPC [1604]. The memory controller [1602] sends the encrypted data it receives from the DPC to the memory [1603]. The process loops until all data are encrypted and saved to the memory [1603]. After the data phase, the DPC [1604] sends the transfer complete signal to the CPU [1600]. Then, the CPU [1600] sends a status signal to the IOC [1607].

Secured Storage System is Used to Retrieve Encrypted Data Stored in the Memory and Send to the IO Device in Plain Text Form FIGS. 18a and 18b show a Read-Decrypt scenario according to an embodiment of the present invention. The IOC [1607] sends the Read-Decrypt command to the CPU [1600]. The CPU [1600] sends a read transfer ready signal to the DPC [1604]. After the command phase, the encrypted data in the memory [1603] is fetched by the memory controller [1602] and then sent to the DPC [1604]. That is, the DPC [1604] sends read request to the memory controller [1602]. The memory controller [1602] retrieves the data from the memory [1603]. The memory controller [1602] responds with a read transfer ready, and then sends the encrypted data to the DPC [1604]. The DPC [1604] decrypts the received encrypted data using its secret key. The decrypted data which is now a plain text is sent to the IO controller [1605]. The IO controller [1605] then directly sends the plain text data to the IOC [1607] without interrupting the CPU [1600]. The process loops until all encrypted data in the memory [1603] are exhausted, decrypted and sent to the IOC [1607]. After the data phase, the DPC [1604] sends the transfer complete signal to the CPU [1600]. Then, the CPU [1600] sends a status signal to the IOC [1607].

Secured Storage System is Used to Perform Data Encryption for the IO Device

The storage system can be used to perform data encryption using the following ways:

[1] Normal Write+Read-Encrypt

FIGS. 19a and 19b show the Read-Encrypt scenario according to an embodiment of the present invention. IOC [1607] sends a normal Write command to the CPU [1600]. CPU [1600] responds to the IOC [1607] with a Write Transfer Ready signal. After the command phase, the IOC [1607] sends the data to the memory controller [1602] via the IO controller [1605] for its data phase. The IO controller [1605] can directly send this data to the memory controller [1602] without the intervention of the CPU [1600]. The memory controller [1602] sends the received data from IO controller to the memory [1603]. The process loops until all data are saved to the memory [1603]. After the data phase, the CPU [1600] sends a status signal to the IOC [1607]. In order to retrieve this data, the IOC [1607] sends another command which is Read-Encrypt to CPU [1600]. The CPU [1600] sends a read transfer ready signal to the DPC [1604]. The data is retrieved from that memory [1603] by the memory controller [1602] and is sent to the DPC [1604] for encryption. That is, the DPC [1604] sends read request to the memory controller [1602]. The memory controller [1602] retrieves the data from the memory [1603]. The memory controller [1602] responds with a read transfer ready, and then sends the data to the DPC [1604]. The data is encrypted using the secret key and the cipher settings tagged in the cipher tag [907] of FIG. 9. After encryption, the DPC [1604] sends the encrypted data to the IOC [1607]. The process loops until all data in the memory [1603] are exhausted, encrypted and sent to the IOC [1607]. After the data phase, the DPC [1604] sends the transfer complete signal to the CPU [1600]. Then, the CPU [1600] sends a status signal to the IOC [1607].

[2] Write-Encrypt+Normal Read

The secured storage system may also provide data encryption when enabled to perform the Write-Encrypt method described in FIGS. 17a and 17b and a normal Read operation in accordance with an embodiment of the present invention. IOC [1607] sends a Write-Encrypt command to the CPU [1600]. CPU [1600] responds to the IOC [1607] with a Write Transfer Ready signal. After the command phase, the IOC [1607] sends the data (that it wishes to be encrypted) via the IO controller [1605] for its data phase. The IO controller [1605] can directly send this data to the DPC [1604] without the intervention of the CPU [1600]. The DPC [1604] with its secret key encrypts the data. This encrypted data is sent to the memory controller [1602] by first sending a write request to it. The memory controller [1602] responds with a write transfer ready signal to the DPC [1604]. The memory controller [1602] sends the encrypted data to the memory [1603]. The process loops until all data are encrypted and saved to the memory [1603]. After the data phase, the DPC [1604] sends the transfer complete signal to the CPU [1600]. Then, the CPU [1600] sends a status signal to the IOC [1607]. To retrieve this encrypted data, the IOC [1607] sends another command which is a normal Read to CPU [1600]. The encrypted data is retrieved from that memory [1603] and sent directly to the IOC [1607]. The process loops until all data is sent to the IOC [1607]. After the data phase, the CPU [1600]

sends a status signal to the IOC [1607]. The performance of the normal Read operation described above in this paragraph is not illustrated in FIGS. 17*a* and 17*b* to avoid overcomplicating the herein disclosure.

[3] Encrypt

FIGS. 21*a* and 21*b* show the Encrypt scenario according to an embodiment of the present invention. IOC [1607] sends an Encrypt command to the CPU [1600]. CPU [1600] responds to the IOC [1607] with an Encrypt Transfer Ready signal. After the command phase, the IOC [1607] sends the data (that it wishes to be encrypted) via the IO controller [1605] for its data phase. The IO controller [1605] can directly send this data to the DPC [1604] without the intervention of the CPU [1600]. The DPC [1604] with its secret key encrypts the data. This encrypted data is sent to the memory controller [1602] by first sending a write request to it. The memory controller [1602] responds with a write transfer ready signal to the DPC [1604]. The memory controller [1602] sends the encrypted data to the memory [1603]. The process loops until all data are encrypted and saved to the memory [1603]. After data encryption, the DPC [1604] sends the transfer complete signal to the CPU [1600]. Then, the CPU [1600] sends status to the IO controller [1605] signaling that it needs to retrieve data from the memory [1603]. The encrypted data is retrieved from that memory [1603] and sent directly to the IOC [1607]. The process loops until all data is sent to the IOC [1607]. After this, the CPU [1600] sends a status signal to the IOC [1607].

Secured Storage System is Used to Perform Data Decryption for the IO Device

The storage system can be used to perform data decryption using the following ways:

[1] Normal Write+Read-Decrypt

FIGS. 18*a* and 18*b* show the Read-Decrypt scenario according to an embodiment of the present invention. IOC [1607] sends a normal Write command to the CPU [1600]. CPU [1600] responds to the IOC [1607] with a Write Transfer Ready signal. After the command phase, the IOC [1607] sends the data to the memory controller [1602] via the IO controller [1605] for its data phase. The IO controller [1605] can directly send this data to the memory controller [1602] without the intervention of the CPU [1600]. The memory controller [1602] sends the data to the memory [1603]. The process loops until all data are saved to the memory [1603]. The performance of the normal Write operation described above in this paragraph is not illustrated in FIGS. 18*a* and 18*b* to avoid overcomplicating the herein disclosure. After the data phase, the CPU [1600] sends a status signal to the IOC [1607]. In order to retrieve this data, the IOC [1607] sends another command which is a Read-Decrypt to CPU [1600]. The CPU [1600] sends a read transfer ready signal to the DPC [1604]. The data is retrieved from that memory [1603] by the memory controller [1602] and send to the DPC [1604] for decryption. That is, the DPC [1604] sends read request to the memory controller [1602]. The memory controller [1602] retrieves the data from the memory [1603]. The memory controller [1602] responds with a read transfer ready, and then sends the data to the DPC [1604]. The data is decrypted using the secret key and the cipher settings tagged in the cipher tag [907] of FIG. 9. After decryption, the DPC [1604] sends the decrypted data to the IOC [1607]. The process loops until all data in the memory [1603] are exhausted, decrypted and sent to the IOC [1607]. After the data phase, the DPC [1604] sends the transfer complete signal to the CPU [1600]. Then, the CPU [1600] sends a status signal to the IOC [1607].

[2] Write-Decrypt+Normal Read

FIGS. 20*a* and 20*b* show the Write-Decrypt scenario according to an embodiment of the present invention. IOC [1607] sends a Write-Decrypt command to the CPU [1600]. CPU [1600] responds to the IOC [1607] with a Write Transfer Ready signal. After the command phase, the IOC [1607] sends the data (that it wishes to be decrypted) via the IO controller [1605] for its data phase. The IO controller [1605] can directly send this data to the DPC [1604] without the intervention of the CPU [1600]. The DPC [1604] with its secret key decrypts the data. This decrypted data is sent to the memory controller [1602] by first sending a write request to it. The memory controller [1602] responds with a write transfer ready signal to the DPC [1604]. The memory controller [1602] sends the decrypted data to the memory [1603]. The process loops until all data are decrypted and saved to the memory [1603]. After the data phase, the DPC [1604] sends the transfer complete signal to the CPU [1600]. Then, the CPU [1600] sends a status signal to the IOC [1607]. In order to retrieve this decrypted data, the IOC [1607] sends another command which is a normal Read to CPU [1600]. The decrypted data is retrieved from that memory [1603] and sent directly to the IOC [1607]. The process loops until all data is sent to the IOC [1607]. After the data phase, the CPU [1600] sends a status signal to the IOC [1607]. The performance of the normal Read operation described above in this paragraph is not illustrated in FIGS. 20*a* and 20*b* to avoid overcomplicating the herein disclosure.

[3] Decrypt

FIGS. 22*a* and 22*b* show the Decrypt scenario according to an embodiment of the present invention. IOC [1607] sends a Decrypt command to the CPU [1600]. CPU [1600] responds to the IOC [1607] with Decrypt Transfer Ready signal. After the command phase, the IOC [1607] sends the data (that it wishes to be decrypted) via the IO controller [1605] for its data phase. The IO controller [1605] can directly send this data to the DPC [1604] without the intervention of the CPU [1600]. The DPC [1604] decrypts the data with its secret key. This decrypted data is sent to the memory controller [1602] by first sending a write request to it. The memory controller [1602] responds with a write transfer ready signal to the DPC [1604]. The memory controller [1602] sends the decrypted data to the memory [1603]. The process loops until all data are decrypted and saved to the memory [1603]. After data decryption, the DPC [1604] sends the transfer complete signal to the CPU [1600]. Then, the CPU [1600] sends a status to the IO controller [1605] signaling that it needs to retrieve data from the memory [1603]. The decrypted data is retrieved from that memory [1603] and sent directly to the IOC [1607]. The process loops until all data is sent to the IOC [1607]. After this, the CPU [1600] sends a status signal to the IOC [1607].

In one embodiment of the present invention, a data security method comprises the steps of generating one or more secret key and one or more cipher setting by one or more IO device; encrypting the one or more secret key and the one or more cipher setting into one or more SET_CIPHER command by the one or more IO device; sending the one or more SET_CIPHER command to one or more CPU via one or more IO controller; recovering the one or more secret key and the one or more cipher setting according to the one or more SET_CIPHER command by the one or more CPU; setting up one or more data processing core according to the one or more cipher setting; and accessing one or more memory data according to the one or more secret key via the one or more data processing core. In this embodiment of the present invention, preferably one or more SET_CIPHER command is sent to the one or more CPU using one or more session key, the memory access is initiated by one or more IO command comprising one or more cipher tag, one or more last transfer tag, and one or more last use of cipher tag. In this embodiment of the present invention, optionally one or more data is encrypted and optionally one or more data is decrypted.

In one embodiment of the present invention, a data security method for secured data communication, processing and storage of one or more IO device comprises the steps of requesting one or more public key from one or more storage controller by the one or more IO device; generating one or more pair of private key and public key by the one or more storage controller; sending the one or more public key from the one or more storage controller to the one or more IO device; generating one or more secret key and one or more cipher setting according to the one or more public key; sending one or more SET_CIPHER command comprising the one or more secret key and the one or more cipher setting to the one or more storage controller; sending one or more data transfer command from the one or more IO device to the one or more storage controller; processing one or more data from the one or more IO device using the one or more secret key according to the one or more cipher setting; transferring and storing the one or more data according to the one or more data transfer command; and deleting the one or more pair of private key and public key, the one or more secret key and the one or more cipher setting. In this embodiment of the present invention, preferably the one or more SET_CIPHER command further comprises one or more data processing algorithm type; one or more data processing mode; one or more data processing key size; one or more data processing secret key; and one or more data processing tag whereby one or more data processing setting is identified. In this embodiment of the present invention, preferably the one or more data transfer command comprises one or more subcommand for specifying data transfer type; one or more last transfer tag for indicating whether data being requested is the last data; one or more cipher tag for identifying cipher setting; and one or more last use of cipher tag for indicating that the one or more pair of private key and public key, the one or more secret key and the one or more cipher setting is used for the last time. In this embodiment of the present invention, optionally one or more data is encrypted and optionally one or more data is decrypted.

In this embodiment of the present invention, an apparatus for secured data processing and storage comprises means for requesting one or more public key from one or more storage controller by the one or more IO device; means for generating one or more pair of private key and public key by the one or more storage controller; means for sending the one or more public key from the one or more storage controller to the one or more IO device; means for generating one or more secret key from the one or more public key and one or more data processing setting; means for sending one or more SET_CIPHER command comprising the one or more secret key and the one or more cipher setting to the one or more storage controller; means for sending one or more data transfer command from the one or more IO device to the one or more storage controller; means for processing one or more data from the one or more IO device using the one or more secret key according to the one or more cipher setting; means for transferring and storing the one or more data according to the one or more data transfer command; and means for deleting the one or more pair of private key and public key, the one or more secret key and the one or more cipher setting. In this embodiment of the present invention, preferably the one or more SET_CIPHER command comprises one or more data processing algorithm type; one or more data processing mode; one or more data processing key size; one or more data processing secret key; and one or more data processing tag whereby one or more data processing setting is identified. In this embodiment of the present invention, preferably the one or more data transfer command comprises one or more subcommand for specifying data transfer type; one or more last transfer tag for indicating whether data being requested is the last data; one or more cipher tag for identifying data processing setting; one or more last use of cipher tag for indicating that the one or more pair of private key and public key, the one or more secret key and the one or more cipher setting is used for the last time. In this embodiment of the present invention, optionally one or more data is encrypted and optionally one or more data is decrypted.

Foregoing described embodiments of the invention are provided as illustrations and descriptions. They are not intended to limit the invention to the precise form described. In particular, it is contemplated that functional implementation of the invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A data security method comprising the steps of:
   generating one or more secret key and one or more cipher setting by one or more input-output device;
   encrypting the one or more secret key and the one or more cipher setting into one or more set_cipher command by the one or more input-output device;
   sending the one or more set_cipher command to one or more CPU via one or more IO controller;
   recovering the one or more secret key and the one or more cipher setting according to the one or more set_cipher command by the one or more CPU;
   setting up one or more data processing core according to the one or more cipher setting; and
   accessing one or more memory data according to the one or more secret key via the one or more data processing core.

2. The data security method of claim 1 wherein the one or more set_cipher command is sent to the one or more CPU using one or more session key.

3. The data security method of claim 2 wherein the memory access is initiated by one or more IO command comprising one or more cipher tag, one or more last transfer tag, and one or more last use of cipher tag.

4. The data security method of claim 1, further comprising:
   decrypting the one or more set_cipher command in order to recover the one or more secret key and the one or more cipher setting.

5. A data security method for secured data communication, processing and storage of one or more input-output device comprising the steps of:
   requesting one or more public key from one or more storage controller by the one or more input-output device;
   generating one or more pair of private key and public key by the one or more storage controller;
   sending the one or more public key from the one or more storage controller to the one or more input-output device;
   generating one or more secret key and one or more cipher setting according to the one or more public key;
   sending one or more set_cipher command comprising the one or more secret key and the one or more cipher setting to the one or more storage controller;
   sending one or more IO command from the one or more input-output device to the one or more storage controller;

processing one or more data from the one or more input-output device using the one or more secret key according to the one or more cipher setting;

transferring and storing the one or more data according to the one or more IO command; and deleting the one or more pair of private key and public key, the one or more secret key and the one or more cipher setting.

6. The data security method of claim 5 wherein the one or more set_cipher command further comprises:

one or more data processing algorithm type;

one or more data processing mode;

one or more data processing key size;

one or more data processing secret key; and one or more data processing tag whereby one or more data processing setting is identified.

7. The data security method of claim 6, further includes using the data processing mode to identify a mode of encryption.

8. The data security method of claim 5 wherein the one or more IO command comprises:

one or more subcommand for specifying a data transfer type;

one or more last transfer tag for indicating whether data being requested is the last data;

one or more cipher tag for identifying cipher setting; and one or more last use of cipher tag for indicating that the one or more pair of private key and public key, the one or more secret key and the one or more cipher setting is used for the last time.

9. The data security method of claims 1, 2, 3, 5, 6, or 8 whereby one or more data is encrypted.

10. The data security method of claims 1, 2, 3, 5, 6, or 8 whereby one or more data is decrypted.

11. The data security method of claim 5, further comprising:

recovering the one or more secret key and the one or more cipher setting by use of the private key.

12. An apparatus for secured data processing and storage comprising:

means for requesting one or more public key from one or more storage controller by the one or more input-output device;

means for generating one or more pair of private key and public key by the one or more storage controller;

means for sending the one or more public key from the one or more storage controller to the one or more input-output device;

means for generating one or more secret key from the one or more public key and one or more cipher setting;

means for sending one or more set_cipher command comprising the one or more secret key and the one or more cipher setting to the one or more storage controller;

means for sending one or more IO command from the one or more input-output device to the one or more storage controller;

means for processing one or more data from the one or more input-output device using the one or more secret key according to the one or more cipher setting;

means for transferring and storing the one or more data according to the one or more command; and means for deleting the one or more pair of private key and public key, the one or more secret key and the one or more cipher setting.

13. The apparatus of claim 12 wherein the one or more set_cipher command comprises:

one or more data processing algorithm type;

one or more data processing mode;

one or more data processing key size;

one or more data processing secret key; and one or more data processing tag whereby one or more data processing setting is identified.

14. The apparatus of claim 13, wherein the data processing mode defines the mode of cipher encryption to be used during data processing.

15. The apparatus of claim 12 wherein the one or more IO command comprises:

one or more subcommand for specifying a data transfer type;

one or more last transfer tag for indicating whether data being requested is the last data;

one or more cipher tag for identifying the cipher setting;

one or more last use of cipher tag for indicating that the one or more pair of private key and public key, the one or more secret key and the one or more cipher setting is used for the last time.

16. The apparatus of claim 12, 13, or 15 wherein one or more data is encrypted.

17. The apparatus of claim 12, 13, or 15 wherein one or more data is decrypted.

18. The apparatus of claim 12, wherein the IO command includes any one of the following IO subcommands: Write-Encrypt, Write-Decrypt, Read-Decrypt, and Read-Encrypt.

19. The apparatus of claim 18, wherein the Read-Encrypt command causes a read command to be performed and causes data that is read in response to the Read-Encrypt command to be encrypted prior to transmission to the one or more input-output device.

20. The apparatus of claim 18, wherein the Write-Decrypt command causes a write command to be performed and causes data that is written in response to the Write-Decrypt command to be decrypted prior to storage of the data.

21. The apparatus of claim 12:

further including a memory; and wherein, if the IO command includes a Write-Decrypt IO subcommand:

the means for processing one or more data processes the data into decrypted data;

the decrypted data is written to the memory by the means for transferring and storing;

the decrypted data is read from the memory by the means for transferring and storing; and the decrypted data is transmitted to the one or more input-output device by the means for sending one or more IO command.

22. The apparatus of claim 12:

further including a memory; and wherein if the IO command is a Read-Encrypt IO subcommand:

the data is read from the memory by the means for transferring and storing;

the data is encrypted by the means for processing one or more data, which generates encrypted data; and the encrypted data is returned to the one or more input-output device by the means for sending one or more IO command.

23. The apparatus of claim 22, wherein the data is in an unencrypted form prior to storage in the memory.

24. The apparatus of claim 12 wherein the one or more set_cipher command comprises:

an operation code;

a set_cipher sub-command;

an initiator ID; and the one or more cipher setting.

25. The apparatus of claim 12, wherein the cipher setting includes:

a cipher algorithm;
a cipher mode;
a cipher key size; and
the secret key.

26. The apparatus of claim 25, the cipher setting further includes a cipher tag for identifying a particular combination of:
the cipher algorithm,
the cipher mode;
the cipher key size, and
the secret key.

27. The apparatus of claim 12, wherein the set_cipher command includes at least one or more cipher setting field.

28. The apparatus of claim 27, wherein the set_cipher command further includes:
an operation code field;
a sub-command field; and
an initiator ID field.

29. The apparatus of claim 28, wherein:
the operation code field is disposed to indicate an operation code;
the sub-command is disposed to indicate a sub-command; and
the initiator ID is disposed to indicate the identity of an input-output device from the one or more input-output device.

30. A data security method comprising:
generating a secret key and a cipher setting by an input-output device;
encrypting the secret key and the cipher setting into a set_cipher command by the input-output device;
sending the set_cipher command to a processor;
decrypting the secret key and the cipher setting in the set_cipher command by the processor;
setting up a data processing core according to the cipher setting; and
providing data security to the data based on the secret key.

31. The data security method of claim 30 wherein the set_cipher command is sent to the processor using a session key.

32. The data security method of claim 30 wherein access to the data is initiated by one or more IO command comprising one or more cipher tag, one or more last transfer tag, and one or more last use of cipher tag.

33. The data security method of claim 30 wherein the data is encrypted using the secret key.

34. The data security method of claim 30 wherein the data is decrypted using the secret key.

35. An apparatus for secured data processing, comprising:
a processor;
an input-output device configured to generate a secret key and a cipher setting, configured to encrypt the secret key and the cipher setting into a set_cipher command, and configured to send the set_cipher command to the processor; and
the processor configured to decrypt the secret key and the cipher setting in the set_cipher command and configured to set up a data processing core according to the cipher setting;
the data processing core configured to provide data security to the data based on the secret key.

36. The apparatus of claim 35 wherein the set_cipher command is sent to the processor using a session key.

37. The apparatus claim 35 wherein access to the data is initiated by one or more IO command comprising one or more cipher tag, one or more last transfer tag, and one or more last use of cipher tag.

38. The apparatus of claim 35 wherein the data is encrypted using the secret key.

39. The apparatus of claim 35 wherein the data is decrypted using the secret key.

40. An apparatus for secured data processing and storage, comprising:
an input-output device configured to request a public key;
a storage controller configured to generate a pair of private key and public key and send the public key to the input-output device;
the input-output device configured to generate a secret key from the public key and a cipher setting, configured to send a set_cipher command comprising the secret key and the cipher setting to the storage controller, and configured to send an IO command to the storage controller;
the storage controller configured to process data from the input-output device using the secret key according to the cipher setting; and
a memory configured to store the data according to the command.

41. The apparatus of claim 40 wherein the set_cipher command comprises:
one or more data processing algorithm type;
one or more data processing mode;
one or more data processing key size;
one or more data processing secret key; and
one or more data processing tag whereby one or more data processing setting is identified.

42. The apparatus of claim 41, wherein the data processing mode defines the mode of cipher encryption to be used during data processing.

43. The apparatus of claim 40 wherein the IO command comprises:
one or more subcommand for specifying a data transfer type;
one or more last transfer tag for indicating whether data being requested is the last data;
one or more cipher tag for identifying the cipher setting;
one or more last use of cipher tag for indicating that the one or more pair of private key and public key, the one or more secret key and the one or more cipher setting is used for the last time.

44. The apparatus of claim 40, 41, or 43 wherein the data is encrypted.

45. The apparatus of claim 40, 41, or 43 wherein the data is decrypted.

46. The apparatus of claim 40, wherein the IO command includes any one of the following IO subcommands: Write-Encrypt, Write-Decrypt, Read-Decrypt, and Read-Encrypt.

47. The apparatus of claim 46, wherein the Read-Encrypt command causes a read command to be performed and causes data that is read in response to the Read-Encrypt command to be encrypted prior to transmission to the one or more input-output device.

48. The apparatus of claim 46, wherein the Write-Decrypt command causes a write command to be performed and causes data that is written in response to the Write-Decrypt command to be decrypted prior to storage of the data.

49. The apparatus of claim 40:
wherein, if the IO command includes a Write-Decrypt IO subcommand:
a data processing core is configured to process the data into decrypted data;
the decrypted data is written to the memory;
the decrypted data is read from the memory; and
the decrypted data is transmitted to the input-output device.

50. The apparatus of claim 40:
wherein if the IO command is a Read-Encrypt IO subcommand:
the data is read from the memory;
a data processing core is configure to encrypt the data; and
the encrypted data is returned to the input-output device.

51. The apparatus of claim 50, wherein the data is in an unencrypted form prior to storage in the memory.

52. The apparatus of claim 40 wherein the set_cipher command comprises:
an operation code;
a set_cipher sub-command;
an initiator ID; and
the one or more cipher setting.

53. The apparatus of claim 40, wherein the cipher setting includes:
a cipher algorithm;
a cipher mode;
a cipher key size; and
the secret key.

54. The apparatus of claim 53, the cipher setting further includes a cipher tag for identifying a particular combination of:
the cipher algorithm,
the cipher mode;
the cipher key size, and
the secret key.

55. The apparatus of claim 40, wherein the set_cipher command includes at least one or more cipher setting field.

56. The apparatus of claim 55, wherein the set_cipher command further includes:
an operation code field;
a sub-command field; and
an initiator ID field.

57. The apparatus of claim 56, wherein:
the operation code field is disposed to indicate an operation code;
the sub-command is disposed to indicate a sub-command; and
the initiator ID is disposed to indicate the identity of an input-output device from the one or more input-output device.

* * * * *